United States Patent
Limberg

(10) Patent No.: US 6,449,325 B1
(45) Date of Patent: Sep. 10, 2002

(54) CIRCUITRY OPERATIVE ON SELECTED SYMBOL SLICING RESULTS FOR SYNCHRONIZING DATA FIELDS IN A DIGITAL TELEVISION RECEIVER

(75) Inventor: Allen LeRoy Limberg, Vienna, VA (US)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/229,603

(22) Filed: Jan. 13, 1999

Related U.S. Application Data

(60) Provisional application No. 60/077,866, filed on Mar. 13, 1998.

(51) Int. Cl.$^7$ ................................................ H04N 5/08
(52) U.S. Cl. ........................ 375/364; 348/525; 348/471
(58) Field of Search .................................. 375/371, 321, 375/345, 368, 364, 340, 343; 348/725, 726, 678, 682, 560, 525, 526, 471; H04N 5/08

(56) References Cited

U.S. PATENT DOCUMENTS 6,125,156 A * 9/2000 Watanabe .................... 375/368

6,233,295 B1 * 5/2001 Wang .......................... 375/364

* cited by examiner

*Primary Examiner*—David E. Harvey
(74) *Attorney, Agent, or Firm*—Robert E. Bushnell, Esq.

(57) ABSTRACT

A digital television signal receiver includes a bin amplitude comparator for symbol decoding and match filtering to recover data synchronizing information from selected bin amplitude comparator responses generated during data slicing. The bin amplitude comparator concurrently supplies bin occupancy results for an amplitude slice including a value +S and for an amplitude slice including a value −S, which values +S and −S define the positive and negative excursions respectively of a binary data synchronization signal, current bin occupancy results being grouped together as two-parallel-bit serial input signal to a shift register clocked at symbol rate. Match filtering to detect data segment synchronization symbol code sequences is provided in accordance with an aspect of the invention by an AND gate supplied bits from selected storage locations in the shift register as wired input signals. In other match filtering performed in accordance with another aspect of the invention, a digital adder network receives bits from selected storage locations in the shift register as wired input signals, and a threshold detector responds to the summed bits exceeding a threshold value to detect data field synchronization symbol code sequences.

37 Claims, 11 Drawing Sheets

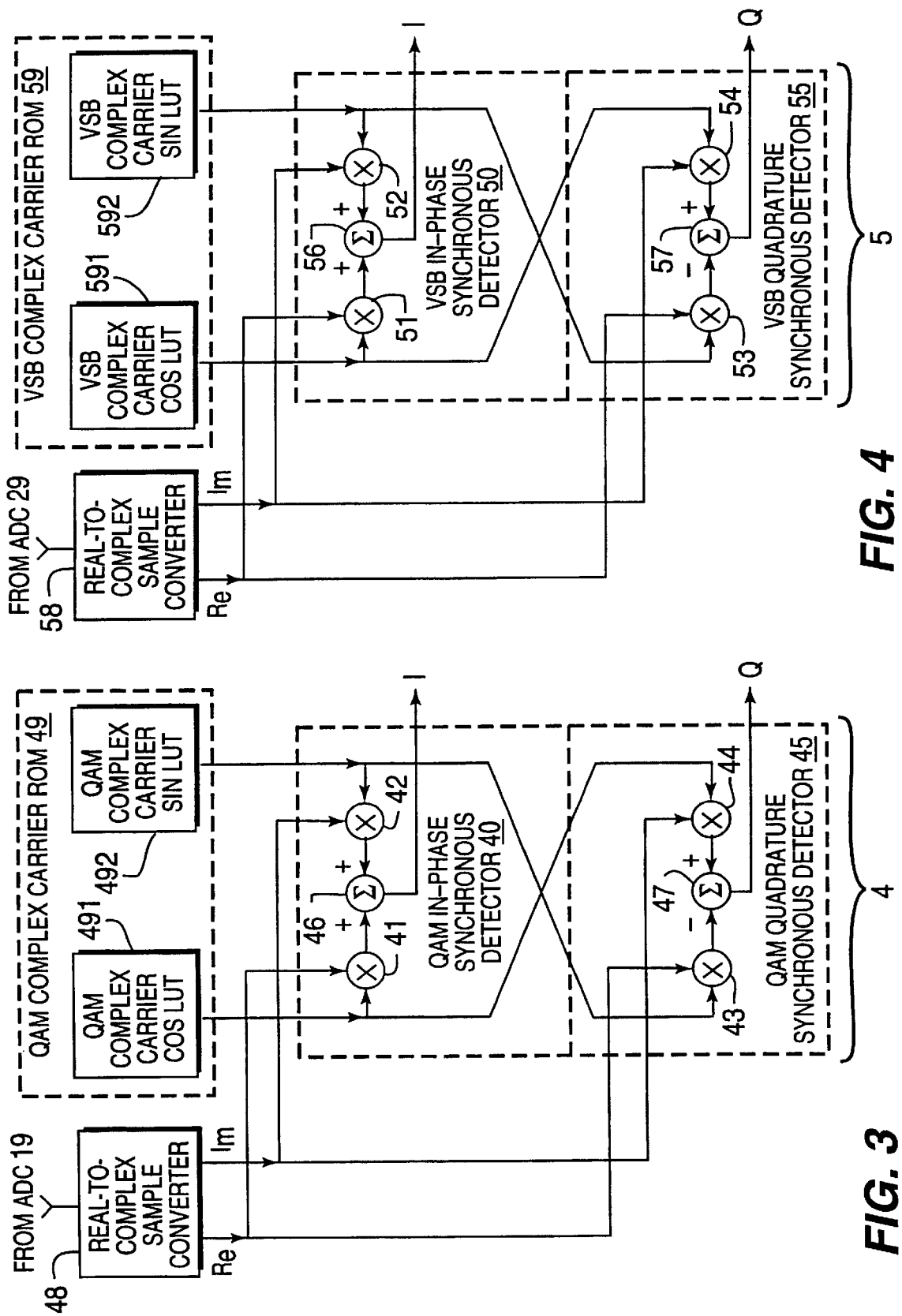

CIRCUITRY OPERATIVE ON SELECTED SYMBOL SLICING RESULTS FOR SYNCHRONIZING DATA FIELDS IN A DIGITAL TELEVISION RECEIVER

This application is filed under 35 U.S.C. 111(a) claiming pursuant to 35 U.S.C. 119(e)(1) benefit of the filing date of provisional application Ser. No. 60/077,866 filed Mar. 13, 1998, pursuant to 35 U.S.C. 111(b).

The invention relates to digital television (DTV) receivers and, more particularly, to the synchronization of data fields in DTV receivers.

BACKGROUND OF THE INVENTION

A Digital Television Standard published Sep. 16, 1995 by the Advanced Television Systems Committee (ATSC) specifies vestigial sideband (VSB) signals for transmitting digital television signals in 6-MHz-bandwidth television channels such as those currently used in over-the-air broadcasting of National Television System Committee (NTSC) analog television signals within the United States. The VSB DTV signal is designed so its spectrum is likely to interleave with the spectrum of a co-channel interfering NTSC analog TV signal. This is done by positioning the pilot carrier and the principal amplitude-modulation sideband frequencies of the DTV signal at odd multiples of one-quarter the horizontal scan line rate of the NTSC analog TV signal that fall between the even multiples of one-quarter the horizontal scan line rate of the NTSC analog TV signal, at which even multiples most of the energy of the luminance and chrominance components of a co-channel interfering NTSC analog TV signal will fall. The video carrier of an NTSC analog TV signal is offset 1.25 MHz from the lower limit frequency of the television channel. The carrier of the DTV signal is offset from such video carrier by 59.75 times the horizontal scan line rate of the NTSC analog TV signal, to place the carrier of the DTV signal about 309,877.6 kHz from the lower limit frequency of the television channel. Accordingly, the carrier of the DTV signal is about 2,690122.4 Hz from the middle frequency of the television channel. The exact symbol rate in the Digital Television Standard is (684/286) times the 4.5 MHz sound carrier offset from video carrier in an NTSC analog TV signal. The number of symbols per horizontal scan line in an NTSC analog TV signal is 684, and 286 is the factor by which horizontal scan line rate in an NTSC analog TV signal is multiplied to obtain the 4.5 MHz sound carrier offset from video carrier in an NTSC analog TV signal. The symbol rate is $10.762238 * 10^6$ symbols per second, which can be contained in a VSB signal extending 5.381119 MHz from DTV signal carrier. That is, the VSB signal can be limited to a band extending 5.690997 MHz from the lower limit frequency of the television channel.

The ATSC standard for digital HDTV signal terrestrial broadcasting in the United States of America is capable of transmitting either of two high-definition television (HDTV) formats with 16:9 aspect ratio. One HDTV format uses 1920 samples per scan line and 1080 active horizontal scan lines per 30 Hz frame with 2:1 field interlace. The other HDTV format uses 1280 luminance samples per scan line and 720 progressively scanned scan lines of television image per 60 Hz frame. The ATSC standard also accommodates the transmission of DTV formats other than HDTV formats, such as the parallel transmission of four television signals having normal definition in comparison to an NTSC analog television signal. DTV transmitted by vestigial-sideband (VSB) amplitude modulation (AM) during terrestrial broadcasting in the United States of America comprises a succession of consecutive-in-time data fields each containing 313 consecutive-in-time data segments. There are 832 symbols per data segment. So, with the symbol rate being 10.76 MHz, each data segment is of 77.3 microseconds duration. Each segment of data begins with a line synchronization code group of four symbols having successive values of +S, −S, −S and +S. The value +S is one level below the maximum positive data excursion, and the value −S is one level above the maximum negative data excursion. The initial line of each data field includes a field synchronization code group that codes a training signal for channel-equalization and multipath suppression procedures. The training signal is a 511-sample pseudo-noise sequence (or "PN-sequence") followed by three 63-sample PN sequences. The middle one of these 63-sample PN sequences is transmitted in accordance with a first logic convention in the first line of each odd-numbered data field and in accordance with a second logic convention in the first line of each even-numbered data field, the first and second logic conventions being one's complementary respective to each other. The other two 63-sample PN sequences and the 511-sample PN sequence are transmitted in accordance with the same logic convention in all data fields.

The remaining lines of each data field contain data that have been Reed-Solomon forward error-correction coded after having been randomized and subjected to diagonal byte interleaving. In over-the-air broadcasting the error-correction coded data are then trellis coded using twelve interleaved trellis codes, each a ⅔ rate punctured trellis code with one uncoded bit. Trellis coding results are parsed into three-bit groups for over-the-air transmission in eight-level one-dimensional-constellation symbol coding, which transmission is made without symbol pre-coding separate from the trellis coding procedure. Trellis coding is not used in cablecasting proposed in the ATSC standard. The error-correction coded data are parsed into four-bit groups for transmission as one-dimensional-constellation sixteen-level symbol coding, which transmissions are made without preceding.

The VSB signals have their natural carrier wave, which would vary in amplitude depending on the percentage of modulation, suppressed. The natural carrier wave is replaced by a pilot carrier wave of fixed amplitude, which amplitude corresponds to a prescribed percentage of modulation. This pilot carrier wave of fixed amplitude is generated by introducing a direct component shift into the modulating voltage applied to the balanced modulator generating the amplitude-modulation sidebands that are supplied to the filter supplying the VSB signal as its response. If the eight levels of 3-bit symbol coding have normalized values of −7, −5, −3, −1, +1, +3, +5 and +7 in the carrier modulating signal, the pilot carrier has a normalized value of 1.25. The normalized value of +S is +5, and the normalized value of −S is −5.

VSB signals using 8-level symbol coding will be used in over-the-air broadcasting within the United States, and VSB signals using 16-level symbol coding can be used in over-the-air narrowcasting systems or in cable-casting systems. However, certain cable-casting is likely to be done using suppressed-carrier quadrature amplitude modulation (QAM) signals instead, rather than using VSB signals. The QAM signals can use 16-state, 32-state or 64-state two-dimensional symbol coding. This presents television receiver designers with the challenge of designing receivers that are capable of receiving either type of transmission and of automatically selecting suitable receiving apparatus for the type of transmission currently being received.

This specification assumes that the data format supplied for symbol encoding is the same in transmitters for the VSB DTV signals and in transmitters for QAM DTV signals using 64-state two-dimensional symbol coding. The VSB DTV signals modulate the amplitude of only one phase of the carrier at symbol rate of $10.76*10^6$ symbols per second to provide a real signal unaccompanied by an imaginary signal, which real signal fits within a 6 MHz band because of its VSB nature with carrier near edge of band. Accordingly, the 64-state QAM DTV signals, which modulate two orthogonal phases of the carrier to provide a complex signal comprising a real signal and an imaginary signal as components thereof, are designed to have a symbol rate of $5.38*10^6$ symbols per second. This complex signal fits within a 6 MHz band because of its QAM nature with carrier at middle of band. The PN sequences which appear in the initial data segment of each data field as transmitted in the VSB signal and supplied for symbol decoding do not appear in the initial data segment of each data field as transmitted in the QAM signal and supplied for symbol decoding. This is because in the 64-state QAM DTV signal the symbols code 6-bit groups of data in two orthogonal dimensions, rather than 3-bit groups of data being symbol coded in one dimension as done in VSB DTV signal. A different method of extracting data synchronization is required for the QAM DTV signal, rather than relying on match filters to respond to PN sequences in the symbol coding as done in the prior art during VSB DTV signal reception.

Data synchronization information for the QAM DTV signal or for the VSB DTV signal can be extracted from the results of symbol decoding, rather than being extracted directly from the symbol coding stream, the inventor points out in a U.S. provisional patent application entitled CIRCUITRY OPERATIVE ON SYMBOL DECODING RESULTS FOR SYNCHRONIZING DATA FIELDS IN A DIGITAL TELEVISION RECEIVER. The symbol decoding results are evaluated as a series of parallel-bit groups each descriptive of a respective symbol, and the occurrence of the symbols used as data synchronization sequences in VSB DTV signals is determined by match filtering of the symbol decoding results, rather than by directly match filtering the symbol codes that generate such decoding results. The extraction of data synchronization from symbol decoding results can provide better discrimination against erroneous detection of data synchronization than the prior-art technique of evaluating symbol polarity change patterns in baseband signals recovered during the reception of VSB signals. Extracting data synchronization from symbol decoding results is particularly useful in QAM/VSB DTV signal receivers capable of receiving both QAM and VSB DTV signals.

The apparatus employed in this previous invention includes at least one data slicer. A common form of data slicer comprises a bin amplitude comparator and read-only memory (ROM). The amplitude bins of the comparator conform to data slices of the digitized baseband symbol code signals, with the occupancy indication for the amplitude bin into which the amplitude of the current digital sample of baseband symbol code falls being a logic ONE and the occupancy indications for the other amplitude bins all being logic ZEROs. The ROM is addressed by the concurrent occupancy indications, which form a unary code, and converts that unary code to a binary code to supply parallel-bit-groups of successive symbol decoding results.

The apparatus employed in this previous invention further includes a shift register receiving as serial input thereto 3-parallel-bit groups each descriptive of a respective decoded symbol. Each match filter comprises respective 3-input decoders for the serial input signal to the first of a number of successive stages of the shift register and for the output signal of each stage in that number of successive stages. The 3-input decoder results are combined using an AND gate when match filtering is performed to detect data segment synchronization symbol code sequences. In other types of match filtering the decoder results are combined using a digital adder network, and a threshold detector responds to the summed decoder results exceeding a threshold value to detect data field synchronization symbol code sequences.

The inventor has subsequently observed that, in regard to VSB DTV signal reception and 64-state QAM DTV signal reception, the bin amplitude comparator portion of the data slicer supplying serial input signal to the shift register supplies serial responses for two of its bins that correlate with the parallel responses of successive ones of the 3-input decoders used in match filtering. This observation has led to the inventor's understanding that the serial responses of these two bins can be supplied as 2-parallel-bit groups to a shift register for implementing a match filter that comprises respective 2-input decoders for the serial input signal to the first of a number of successive stages of the shift register and for the output signal of each stage in that number of successive stages. In this less preferred embodiment of the invention, the shift register with three bits stored in each stage is dispensed with in favor of the shift register with two bits stored in each stage, and each 3-input decoder used in match filtering is dispensed with in favor of a 2-input decoder. This results in considerable saving in digital hardware. Since a symbol can generate response in only one of two non-adjacent bins of the bin amplitude comparator, each 2-input decoder is redundant and can be eliminated in favor of a wired connection to receive one of the two bits in the 2-parallel-bit group to be decoded. Replacing the 2-input decoders with respective wired connections results in further saving in digital hardware.

SUMMARY OF THE INVENTION

The invention is embodied in a principal aspect thereof in a digital television signal receiver including a bin amplitude comparator in the data slicing circuitry for performing symbol decoding and match filtering to recover data synchronizing information from selected bin amplitude comparator responses generated during data slicing. The bin amplitude comparator concurrently supplies bin occupancy results for an amplitude slice including a value +S and for an amplitude slice including a value −S, which values +S and −S define the positive and negative excursions respectively of a binary data synchronization signal, current bin occupancy results being grouped together as two-parallel-bit serial input signal to a shift register clocked at symbol rate. Match filtering to detect data segment synchronization symbol code sequences is provided in accordance with an aspect of the invention by an AND gate supplied bits from selected storage locations in the shift register as wired input signals. In other match filtering performed in accordance with another aspect of the invention, a digital adder network receives bits from selected storage locations in the shift register as wired input signals, and a threshold detector responds to the summed bits exceeding a threshold value to detect data field synchronization symbol code sequences.

BRIEF DESCRIPTION OF THE DRAWING

FIG. 3 is a block schematic diagram showing in greater detail the circuitry used in FIG. 1 and in FIG. 2 for synchrodyning QAM DTV signal to baseband in the digital regime.

FIG. 4 is a block schematic diagram showing in greater detail the circuitry used in FIG. 1 and in FIG. 2 for synchrodyning VSB DTV signal to baseband in the digital regime.

DETAILED DESCRIPTION

Figure 1:
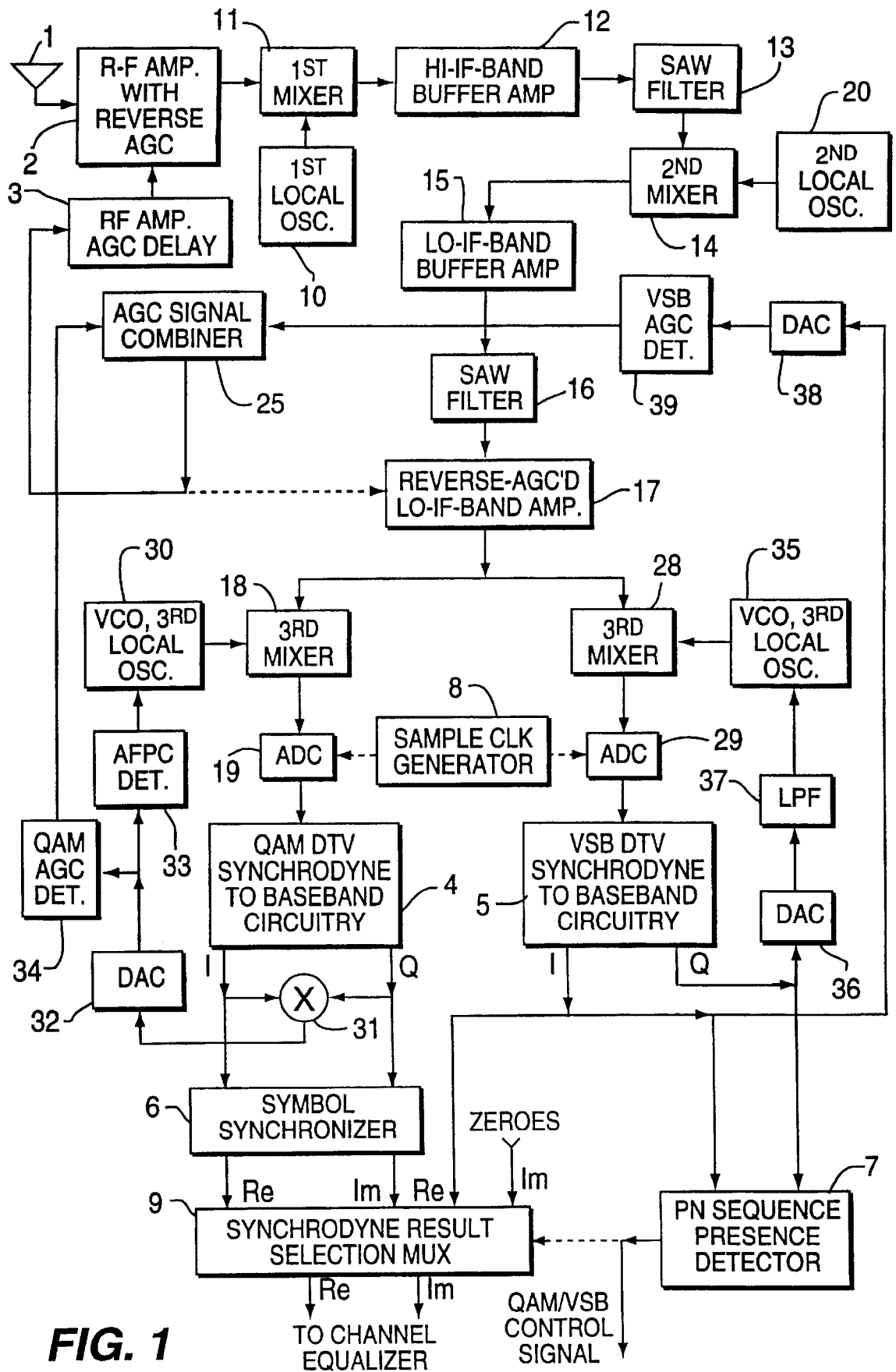
FIG. 1 is a block schematic diagram of the radio receiver portions of a QAM/VSB DTV signal receiver used to recover baseband symbol coding for QAM DTV signal and for VSB DTV signal.

FIG. 1 shows the radio receiver portions of a DTV receiver capable of receiving either QAM or VSB digital TV signals. An antenna 1 is a representative source of TV signals in ultra high frequency (UHF) band, or possibly in the very high frequency (VHF) band, which TV signals are applied to a radio-frequency (RF) amplifier 2. The RF amplifier 2 is provided with a tracking preselection filter for selecting a portion of the one of the television broadcast bands the television signal selected for reception reposes in. The RF amplifier 2 is reverse-AGC'd in delayed response to AGC signals applied to RF amplifier 2 via an AGC delay circuit 3. The RF amplifier 2 supplies amplified response to the television signal selected for reception.

This amplified response is mixed with a super-heterodyning signal from a first local oscillator 10 for upconversion to a high intermediate-frequency-band, which is above the highest frequency television channel in the ultra-high frequency (UHF) spectrum. In line with current TV practice, the first local oscillator 10 is usually a frequency synthesizer for generating the super-heterodyning signal of a frequency in selected ratio with the frequency of a component controlled oscillator, with the frequency of the controlled oscillator being controlled by AFT signal. This preferred practice results in the sensitivity of the super-heterodyning signal frequency to AFT signal being substantially the same for all received TV channels. The 6-MHz-wide selected radio-frequency signal supplied by the RF amplifier 2 is upconverted to a high-band intermediate-frequency signal in a first mixer 11, which preferably is of a doubly-balanced linear-multiplication type. The high-band intermediate-frequency signal is centered at an ultra-high frequency above that portion of the UHF band containing assigned channels for television broadcasting, placing the image frequencies well above 1 GHz so they are easily rejected by a bandpass coupling network at the output of the first mixer 11.

A high-intermediate-frequency-band buffer amplifier 12 applies the high-band IF signal to a surface-acoustic-wave (SAW) filter 13. The buffer amplifier 12 provides fixed gain to make up the 10–12 dB insertion loss of the SAW filter 13 and drives the SAW filter 13 from a fixed source impedance chosen to avoid unwanted reflections. The SAW filter 13 has a substantially linear-phase, flat-amplitude response that has −1 dB to −1 dB bandwidth of substantially 6 MHz, which passband is symmetrical around a midband frequency. By way of example, the UHF IF signal can be centered at 916 MHz. A gallium arsenide SAW filter 13 can be operated satisfactorily in this frequency range. The response of the SAW filter 13 is supplied to a second mixer 14 for down-conversion to a low-band intermediate-frequency signal centered at a very high frequency below that portion of the VHF band containing assigned channels for television broadcasting. The low-band IF signal can be centered at about 44 MHz, as common in analog TV practice. A local oscillator 20, which is preferably of a crystal-controlled type, supplies a heterodyning signal of stable fixed frequency to the second mixer 14 for implementing the down-conversion therein. The second mixer 14 is preferably of a doubly-balanced linear-multiplication type.

A low-intermediate-frequency-band buffer amplifier 15 applies the low-band IF signal to a surface-acoustic-wave (SAW) filter 16 designed for flat response over at least a 6 MHz bandwidth. The buffer amplifier 15 provides fixed gain to make up the 10–12 dB insertion loss of the SAW filter 16 and drives the SAW filter 16 from a fixed source impedance chosen to avoid unwanted reflections. The SAW filter 16 has a substantially linear-phase response over a bandwidth in excess of 6 MHz, so that the earlier SAW filter 13 determines the channel characteristics of the first IF amplifier chain. A lithium niobate SAW filter 16 can be operated satisfactorily in the frequency range centered at about 44 MHz. The response of the SAW filter 16 is supplied as input signals to automatic-gain-controlled low-intermediate-frequency-band (VHF) amplifier 17. The low-IF-band amplifier 17 supplies its response as input signal to a third mixer 18, which supplies a final intermediate-frequency signal for digitization by an analog-to-digital converter 19, and to another third mixer 28, which supplies a final intermediate-frequency signal for digitization by an analog-to-digital converter 29.

A voltage-controlled oscillator 30 supplies VHF oscillations to the third mixer 18 for heterodyning with low-IF-band amplifier 17 response to generate a final intermediate-frequency signal the lowest frequency of which is offset only a megaHertz or so from zero frequency. This final IF signal is supplied to digital synchrodyne circuitry 4, which is designed for responding to QAM DTV signal in the final intermediate-frequency signal to recover respective in-phase (I) and quadrature-phase (Q) baseband signals that are supplied to symbol synchronizer circuitry 6 to be converted to real and imaginary baseband signals descriptive of QAM symbols. A digital multiplier 31, which in order to secure speedy operation is preferably implemented in read-only memory (ROM), multiplies these I and Q baseband signals together. The resulting product which contains samples descriptive of a low frequency beat term and of a term at symbol rate is converted to analog form by a digital-to-analog converter 32. The DAC 32 response is supplied to an automatic-frequency-and-phase-control detector 33, and the AFPC detector 33 response is applied to the VCO 30, for adjusting the frequency and phase of the VCO to reduce the low frequency beat term in the DAC 32 response to zero frequency. This feedback control of the voltage-controlled third local oscillator 30 is a species of Costas loop.

A QAM automatic-gain-control detector 34 responds to the DAC 32 response to generate a first input signal for an AGC signal combiner 25, which applies an automatic-gain-control (AGC) signal to the low-IF-band amplifier 17. In order better to preserve linearity of the QAM digital modulation in the low-IF-band amplifier 17 response, reverse AGC is employed with this amplifier.

A voltage-controlled oscillator 350 supplies VHF oscillations to the third mixer 28 for heterodyning with low-IF-band amplifier 17 response to generate a final intermediate-frequency signal the lowest frequency of which is offset only a megaHertz or so from zero frequency. This final IF signal is supplied to digital synchrodyne circuitry 5, which is designed for responding to VSB DTV signal in the final intermediate-frequency signal to recover respective in-phase (I) and quadrature-phase (Q) baseband signals, at the least the former of which baseband signals is descriptive of VSB AM symbols. The quadrature-phase baseband signal from the synchrodyne circuitry 5 is converted to analog form by a digital-to-analog converter 36, and a lowpass filter 37 extracts a low-frequency beat term from the DAC 36 response for application to the VCO 35 as an AFPC signal, for adjusting the frequency and phase of the VCO 35 to reduce the low frequency beat term in the lowpass filter 37 response to zero.

The in-phase baseband signal from the synchrodyne circuitry 5 is converted to analog form by a digital-to-analog converter 38, and a VSB automatic-gain-control detector 34 responds to the DAC 38 response to generate a second input signal for the AGC signal combiner 25. Supposedly only one of the respective responses from the AGC detectors 34 and 39 will indicate need for reducing radio receiver gain, so the AGC signal combiner 25 can be configured to act as an analog OR circuit for those responses, developing AGC signals responsive only to that one of the respective responses from the AGC detectors 34 and 39 which most indicates need for reducing radio receiver gain. The AGC signal combiner 25 supplies AGC signal to the low-IF-band amplifier 17 and also forwards AGC signal to the AGC delay circuit 3 for reducing the gain of the RF amplifier 2 when very strong signal reception obtains.

The in-phase (I) and quadrature-phase (Q) baseband signals from the digital synchrodyne circuitry 5 are supplied to a PN sequence presence detector 7. The PN sequence presence detector 7 may be of a type for sensing the PN63 sequences transmitted during field sync data segments in a received VSB DTV signal. However, the PN sequence presence detector 7 preferably is of a type for sensing the PN511 sequences transmitted during those field sync data segments, and the operation of the FIG. 1 apparatus will be described presuming such PN sequence presence detector 7 being used. The PN sequence presence detector 7 supplies indications of the absence or presence of the PN511 sequences transmitted during field sync data segments in a received VSB DTV signal, thereby to. provide a QAM/VSB reception control signal used as control signal by a synchrodyne result selection multiplexer 9.

Responsive to the PN sequence presence detector 7 indicating the absence of PN511 sequences, the DTV signal receiver is conditioned for operation in a QAM reception mode. In the QAM reception mode the synchrodyne result selection multiplexer 9 is conditioned to forward the real and imaginary baseband signals from the symbol synchronizer 6 to an amplitude-and-group-delay equalizer 90 shown in FIG. 2.

Responsive to the PN sequence presence detector 7 indicating the presence of PN511 sequences, the DTV signal receiver is conditioned for operation in a VSB reception mode. In the VSB reception mode the synchrodyne result selection multiplexer 9 selects the in-phase and quadrature-phase baseband signals from the digital synchrodyne circuitry 5 to be forwarded as real and imaginary baseband signals to the amplitude-and-group-delay equalizer 90 shown in FIG. 2.

Figure 2:
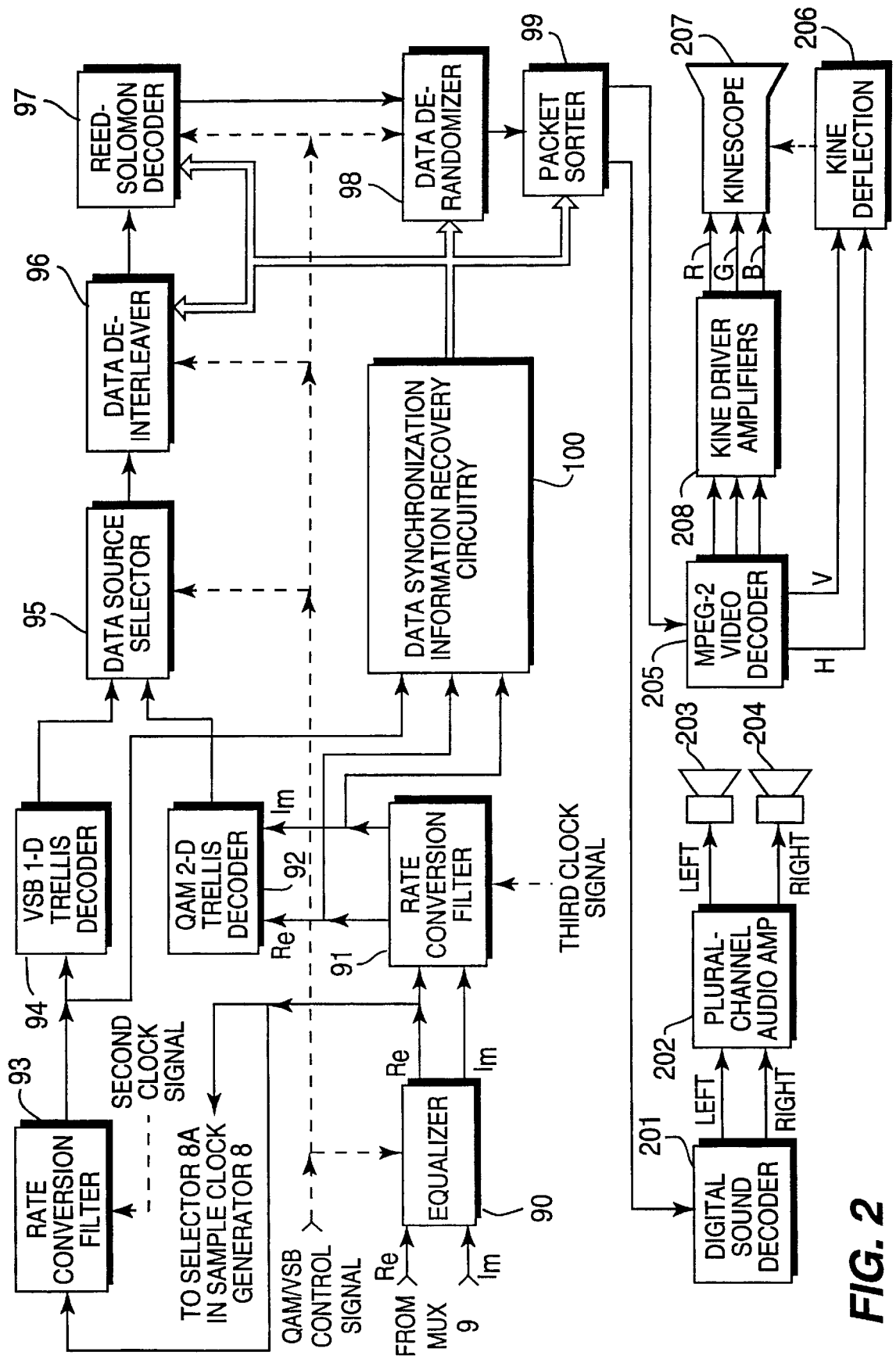
FIG. 2 is a block schematic diagram of the portions of the QAM/VSB DTV signal receiver for processing baseband symbol coding for QAM DTV signal and for VSB DTV signal, as recovered by the FIG. 1 radio receiver portions, which FIG. 2 portions of the QAM/VSB DTV signal receiver recover data synchronizing information in accordance with an aspect of the invention.

The amplitude-and-group-delay equalizer 90 shown in FIG. 2 converts a baseband response with an amplitude-versus-frequency characteristic that tends to cause inter-symbol error to a more optimum amplitude-versus-frequency characteristic that minimizes the likelihood of inter-symbol error. The amplitude-and-group-delay equalizer 90 can be a suitable one of the monolithic ICs available off-the-shelf for use in equalizers. Such an IC includes a multiple-tap finite-impulse-response digital filter used for amplitude-and-group-delay equalization, the tap weights of which FIR filter are programmable; circuitry for selectively accumulating training signal and temporarily storing the accumulation results; and a microcomputer for comparing the temporarily stored accumulation results with an ideal training signal as known a priori and for calculating updated tap weights of the multiple-tap digital filter used for amplitude-and-group-delay equalization. Other configurations for the equalizer 90 separate the functions of ghost-cancellation and equalization to reduce the number of taps in the kernel of the filter used for final amplitude-and-group-delay equalization after ghost-cancellation is carried out by cascaded sparse-kernel filters of finite- and infinite-impulse response types. The equalizer 90 can be designed such that after initial determination of equalization filter parameters is done using a training signal to speed up convergence, the filter parameters are adjusted by data directed methods to improve dynamic operation under changing multipath conditions.

The real response of the amplitude-and-group-delay equalizer 90 is supplied to circuitry in FIG. 6 that carries out symbol synchronization, as will be explained with reference to FIG. 6 further on in this specification. The real response of the equalizer 90 must be oversampled to facilitate symbol synchronization, and the imaginary response of the equalizer 90 is sampled at the same rate as its real response.

Referring back to FIG. 2, a rate conversion filter 91 decimates the real and imaginary responses of the equalizer 90 to generate a $5.38*10^6$ samples per second response at the symbol rate for QAM, to be applied as input signal to two-dimensional symbol decoding circuitry 92, which performs the symbol decoding that recovers symbol-decoded digital data streams from a QAM DTV signal. Presuming that the QAM DTV signal contains data synchronizing information corresponding with that in an ATSC VSB DTV signal, one of these symbol-decoded digital data streams is generated by trellis-decoding the results of data-slicing procedures, and another of these symbol-decoded digital data streams is generated by data-slicing without subsequent trellis decoding. This latter symbol-decoded digital data stream is employed for controlling data handling by the receiver responsive to synchronization information contained in the received QAM-origin signal. Optimal Viterbi decoding techniques are customarily employed to generate the trellis-decoded digital data stream supplied for further data processing.

A rate conversion filter 93 decimates the real response of the equalizer 90 to generate a $10.76*10^6$ samples per second response at the symbol rate for VSB, to be applied as input signal to one-dimensional symbol decoding circuitry 94, which performs the symbol decoding that recovers symbol-decoded digital data streams from a VSB DTV signal. A VSB DTV signal in accordance with the ATSC standard uses trellis coding of the data in all data segments except the initial data segment of each data field, which contains field synchronization code groups that are not subject to trellis coding. One of the symbol-decoded digital data streams that the symbol decoding circuitry 94 supplies, which is to be employed for further data processing, is generated by trellis-decoding the results of data-slicing procedures; and optimal Viterbi decoding techniques are customarily employed. Another of the symbol-decoded digital data streams that the symbol decoding circuitry 94 supplies, which is to be employed for controlling data handling by the receiver responsive to synchronization information contained in the received VSB DTV signal, is generated using data-slicing procedures without subsequent trellis decoding.

A digital-signal multiplexer 95 functions as a data source selector that selects as its response either a first or a second one of two digital input signals thereto, the selection being controlled by the PN sequence presence detector 7. When the PN sequence presence detector 7 does not detect the PN511 sequences that accompany a VSB signal, the multiplexer 95 selectively responds to its first digital input signal, selecting as the source of its digital data output the two-dimensional symbol decoding circuitry 92 that decodes the symbols received in the QAM signal. When the PN sequence presence detector 7 detects the presence of the PN511 sequences that accompany a VSB signal, the multiplexer 95 selectively responds to its second digital input signal, selecting as the source of its digital data output the one-dimensional symbol decoding circuitry 94 that decodes the symbols received in the VSB signal. The data selected by the data source selection multiplexer 95 are applied to a data de-interleaver 96 as its input signal, and the de-interleaved data supplied from the data de-interleaver 96 are applied to a Reed-Solomon decoder 97. The data de-interleaver 96 is often constructed within its own monolithic IC and is made so as to respond to the output indications from the PN sequence presence detector 7 to select the de-interleaving algorithm suitable to the DTV signal currently being received, whether it be of QAM or VSB type. The Reed-Solomon decoder 97 is often constructed within its own monolithic IC and is made so as to respond to the output indications from the PN sequence presence detector 7 to select the appropriate Reed-Solomon decoding algorithm for the DTV signal currently being received, whether it be of QAM or VSB type. Error-corrected data are supplied from the Reed-Solomon decoder 97 to a data de-randomizer 98, which responds to these data for regenerating a signal randomized prior to transmission to the DTV receiver, which regenerated signal comprises packets of data for a packet sorter 99. The data de-randomizer 98 is made so as to respond to the output indications from the PN sequence presence detector 7 to select the appropriate data de-randomizing algorithm for the DTV signal currently being received, whether it be of QAM or VSB type.

Data synchronization information recovery circuitry 100, which will be described in greater detail farther on in this specification with reference to FIGS. 7 and 8 of the drawing, generates the data synchronizing information used by the data de-interleaver 96, the Reed-Solomon decoder 97, the data de-randomizer 98 and possibly the packet sorter 99. The data synchronization information recovery circuitry 100 receives QAM/VSB control signal from the PN sequence presence detector 7 of FIG. 1. When the PN sequence presence detector 7 generates an indication that conditions the DTV signal receiver for operation in the QAM signal reception mode, the data synchronization information recovery circuitry 100 recovers data synchronizing information from the symbol decoded QAM baseband DTV signal furnished by the QAM symbol decoding circuitry 92. When the PN sequence presence detector 7 generates an indication that conditions the DTV signal receiver for operation in the VSB signal reception mode, the data synchronization information recovery circuitry 100 recovers data synchronizing information from the symbol decoded VSB baseband DTV signal furnished by the VSB symbol decoding circuitry 94.

The packet sorter 99 sorts packets of data for different applications, responsive to header codes in the successive packets of data. Packets of data descriptive of the audio portions of the DTV program are applied by the packet sorter 99 to a digital sound decoder 201. The digital sound decoder 201 supplies left-channel and right-channel stereophonic sound signals to a plural-channel audio amplifier 202 that drives the plurality of loudspeakers 203, 204. Packets of data descriptive of the video portions of the DTV program are applied by the packet sorter 99 to an MPEG decoder 205, such as of MPEG-2 type. The MPEG decoder 205 supplies horizontal (H) and vertical (V) synchronizing signals to kinescope deflection circuitry 206 that provides for the raster scanning of the viewing screen of a kinescope 207. The MPEG decoder 205 also supplies signals to the kinescope driver amplifiers 208 for applying amplified red (R), green (G) and blue (B) drive signals to the kinescope 207. In variations of the DTV receiver shown in FIGS. 1 and 2, a different display device may be used instead of or in addition to the kinescope 207, and the sound recovery system may be different, consisting of but a single audio channel, or being more elaborate than a simple stereophonic reproduction system.

FIG. 3 shows in more detail the digital circuitry 4 for synchrodyning QAM DTV signals to baseband. The QAM synchrodyning circuitry 4 includes the QAM in-phase synchronous detector 40 for generating the real portion of its output signal and the QAM quadrature-phase synchronous detector 45 for generating the imaginary portion of its output signal. The QAM synchrodyning circuitry 4 is essentially a complex digital multiplier which multiplies a real-to-complex sample converter 48 response to the digital samples from the ADC 19 by a complex digital samples of QAM carrier wave read from a read-only memory 49. The QAM synchrodyning circuitry 4 includes a digital adder 46, a digital subtractor 47, and respective first, second, third and fourth digital multipliers 41–44. The QAM in-phase synchronous detector 40 includes the multiplier 41, the multiplier 42, and the adder 46 for adding the product output signals of the multipliers 41 and 42 to generate the real portion of the output signal of the QAM synchrodyning circuitry 4. The first digital multiplier 41 multiplies the real digital samples of final IF signal supplied from the real-to-complex-sample converter 48 by digital samples descriptive of the cosine of the QAM carrier that are read from a look-up table 491 in the ROM 49, and the second digital multiplier 42 multiplies the imaginary digital samples of final IF signal supplied from the real-to-complex-sample converter 48 by digital samples descriptive of the sine of the QAM carrier that are read from a look-up table 492 in the ROM 49. The QAM quadrature-phase synchronous detector 45 includes the multiplier 43, the multiplier 44, and the subtractor 47 for subtracting the product output signal of the multiplier 43 from the product output signal of the multiplier 44 to generate the imaginary portion of the output signal of the QAM synchrodyning circuitry 4. The third digital multiplier 43 multiplies the real digital samples of final IF signal supplied from the real-to-complex-sample converter 48 by digital samples descriptive of the sine of the QAM carrier that are read from the look-up table 492 in the ROM 49, and the fourth digital multiplier 44 multiplies the imaginary digital samples of final IF signal supplied from the real-to-complex-sample converter 48 by digital samples descriptive of the cosine of the QAM carrier that are read from the look-up table 491 in the ROM 49.

FIG. 4 shows in more detail the digital circuitry 5 for synchrodyning VSB DTV signals to baseband. The VSB synchrodyning circuitry 5 includes the VSB in-phase synchronous detector 50 for generating the real portion of its output signal and the VSB quadrature-phase synchronous detector 55 for generating the imaginary portion of its output signal. The VSB synchrodyning circuitry 5 is essentially a complex digital multiplier which multiplies a real-to-complex digital sample converter 58 response to the digital samples from the ADC 29 by a complex digital samples of QAM carrier wave read from a read-only memory 59. The VSB synchrodyning circuitry 5 includes a digital adder 56, a digital subtractor 57, and respective first, second, third and fourth digital multipliers 51–54. The VSB in-phase synchronous detector 50 includes the multiplier 51, the multiplier 52, and the adder 56 for adding the product output signals of the multipliers 51 and 52 to generate the real portion of the output signal of the VSB synchrodyning circuitry 5. The first digital multiplier 51 multiplies the real digital samples of final IF signal supplied from the real-to-complex-sample converter 58 by digital samples descriptive of the cosine of the VSB carrier that are read from a look-up table 591 in the ROM 59, and the second digital multiplier 52 multiplies the imaginary digital samples of final IF signal supplied from the real-to-complex-sample converter 58 by digital samples descriptive of the sine of the VSB carrier that are read from a look-up table 592 in the ROM 59. The VSB quadrature-phase synchronous detector 55 includes the multiplier 53, the multiplier 54, and the subtractor 57 for subtracting the product output signal of the multiplier 53 from the product output signal of the multiplier 54 to generate the imaginary portion of the output signal of the VSB.synchrodyning circuitry 5. The third digital multiplier 53 multiplies the real digital samples of final IF signal supplied from the real-to-complex-sample converter 58 by digital samples descriptive of the sine of the VSB carrier that are read from the look-up table 592 in the ROM 59, and the fourth digital multiplier 54 multiplies the imaginary digital samples of final IF signal supplied from the real-to-complex-sample converter 58 by digital samples descriptive of the cosine of the VSB carrier that are read from the look-up table 591 in the ROM 59.

The real-to-complex-sample converters 48 and 58 of FIGS. 3 and 4 can employ Hilbert transform generation filters and delay compensation circuitry as described by C. B. Patel et alii in U.S. Pat. No. 5,479,449 issued Dec. 26, 1995, entitled DIGITAL VSB DETECTOR WITH BANDPASS PHASE TRACKER, AS FOR INCLUSION IN AN HDTV RECEIVER, and incorporated herein by reference. Alternatively, the real-to-complex-sample converters 48 and 58 can employ Rader filters as described by C. B. Patel et alii in U.S. Pat. No. 5,548,617 issued Oct. 20, 1996, entitled DIGITAL VSB DETECTOR WITH BANDPASS PHASE TRACKER USING RADER FILTERS, AS FOR USE IN AN HDTV RECEIVER, and incorporated herein by reference. Or, the real-to-complex-sample converters 48 and 58 can employ Ng filters as described by C. B. Patel et alii in U.S. patent application Ser. No. 08/577,469 filed Dec. 22, 1995, entitled DIGITAL VSB DETECTOR WITH BANDPASS PHASE TRACKER USING NG FILTERS, AS FOR USE IN AN HDTV RECEIVER, and incorporated herein by reference.

Figure 5:
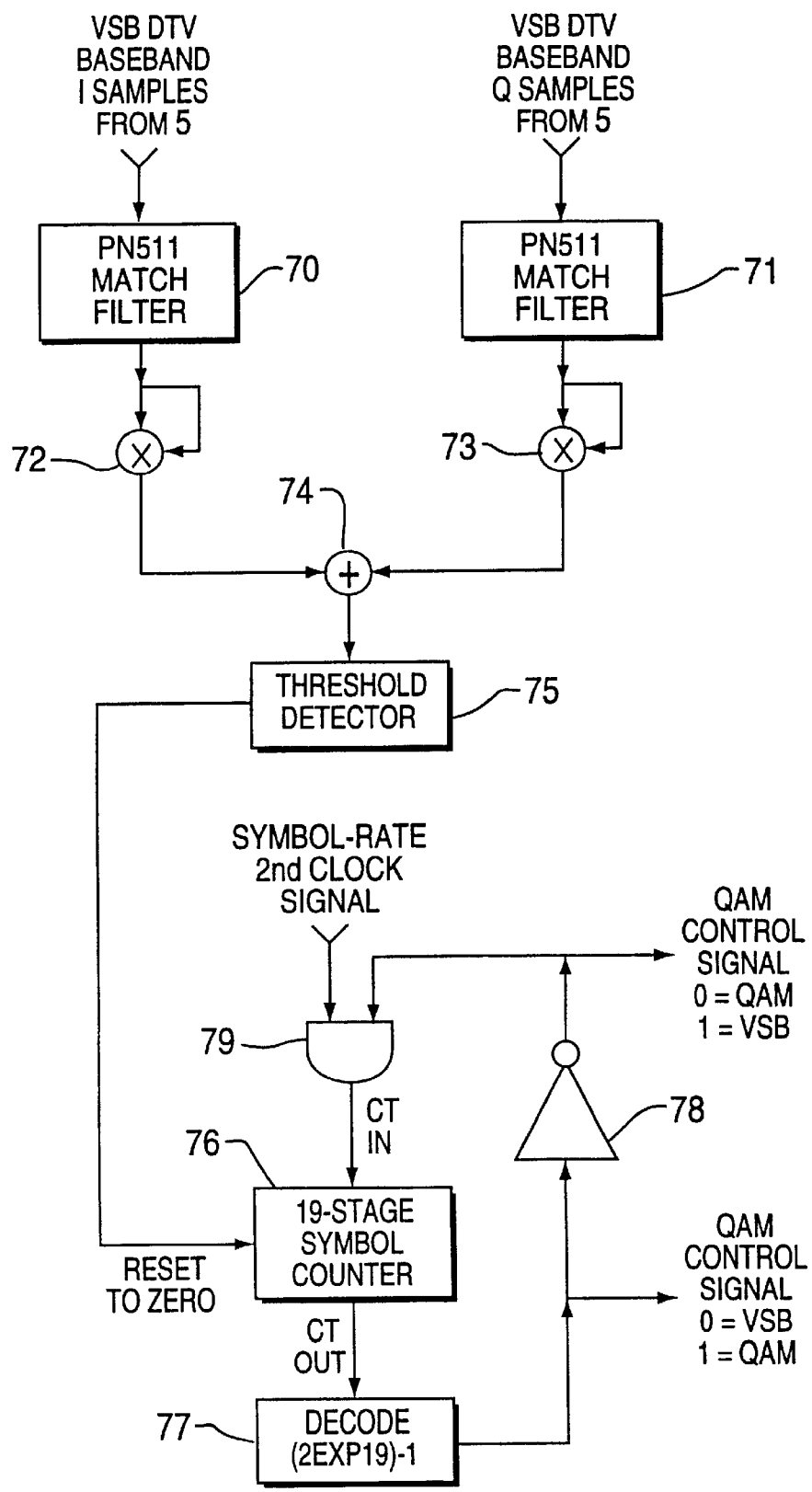
FIG. 5 is a block schematic diagram of one way in which the PN sequence presence detector shown in FIG. 1 can be constructed.

FIG. 5 shows in detail a preferred construction of the PN sequence presence detector 7, which detects the presence of PN511 sequences in output signals from the digital synchrodyne circuitry 5. When the AFPC loop for controlling the digitized final IF signal supplied to the digital synchrodyne circuitry 5 is in proper frequency and phase lock, the imaginary sample stream from the digital synchrodyne circuitry 5 will consist of samples of null value except for noise, and the PN511 sequences will occur only in the real sample stream from the digital synchrodyne circuitry 5. When the AFPC loop for controlling the digitized final IF signal supplied to the digital synchrodyne circuitry 5 is not in proper phase lock, PN511 sequences will occur to some degree in the imaginary sample stream from the digital synchrodyne circuitry 5, and PN511 sequences will have diminished energy in the real sample stream from the digital synchrodyne circuitry 5. So, it is preferable to examine both the real and the imaginary sample streams from the digital synchrodyne circuitry 5 for the presence of PN511 sequences. The real and the imaginary sample streams from the digital synchrodyne circuitry 5 are accordingly supplied as input signals to respective match filters 70 and 71 for PN511 sequences.

In representative construction each of the match filters 70 and 71 includes a digital delay line having a sufficient number of stages to include one less than as many samples as required to describe 511 symbols; and the digital delay line is tapped at the input of its first stage and at the output of each of its stages. These taps are assigned +1 and −1 weights in a weighted summer, the weighting pattern being such as to provide match filtering for a PN511 sequence. The match filter 70 response is supplied to a squaring circuit 72, and the match filter 71 response is supplied to a squaring circuit 73 similar to the squaring circuit 72. The squaring circuits 71 and 72 can realized in logic circuitry or in read-only memory (ROM). The squared match filter responses from the squaring circuits 71 and 72 are added in a digital adder 74 to obtain a measure of the combined energy of PN511 sequence components in the real and the imaginary sample streams from the digital synchrodyne circuitry 5. A threshold detector 75 responds to the combined energy of PN511 sequence components in these real and the imaginary sample streams exceeding a threshold value to generate a pulse indicative of the occurrence of components of the PN511 sequence in one or both of the real and the imaginary sample streams from the digital synchrodyne circuitry 5. This indication must be latched for at least one data field so the DTV signal receiver will be kept in the VSB reception mode until such time as PN511 sequences are no longer detected each data field or so. The timed latch for performing this latching function can be constructed around a monostable, for example, or alternatively around a symbol counter as shown in FIG. 5.

In FIG. 5 each pulse the threshold detector 75 generates indicative of the occurrence of a PN511 sequence is used to reset a symbol counter 76 to an initial count value (zero). The symbol counter 76 counts occurrences of the second clock signal at symbol rate, as selectively applied to its count input, the counting being done for determining how long it has been since a PN511 sequence with appreciable energy was last detected. By way of example, the symbol counter 76 contains 19 binary stages to permit counting somewhat more than a data frame of symbols. The count output from the symbol counter 76 is supplied to a decoder 77 which decodes a count somewhat short of fall count and somewhat more than the number of symbols per data frame, thereby to supply a ONE output rather than the ZERO output otherwise supplied. This decoded count should never be reached if a PN511 sequence is detected at least once per data frame to re-initialize the count output. The decoder 77 output signal provides a QAM/VSB control signal that is ONE when the DTV receiver is to be operated in the QAM reception mode and that is ZERO when the DTV receiver is to be operated in the VSB reception mode. The decoder 77 output signal is inverted by a logic inverter 78 to generate a complementary QAM/VSB control signal that is ZERO when the DTV receiver is to be operated in the QAM reception mode and that is ONE when the DTV receiver is to be operated in the VSB reception mode. One or both of these QAM/VSB control signals is supplied as output signal from the PN sequence presence detector 7.

The logic inverter 78 output signal and the second clock signal supplied at symbol rate are applied as first and second input signals to a two-input AND gate 79. If no PN511 sequence is detected for more than a data frame, so the decoder 77 output signal becomes a ONE, the logic inverter 78 generates an output signal that is ZERO. This conditions the AND gate 79 no longer to supply second clock signal to the symbol counter 76 for counting. The counter 76 output count remains at that value the decoder 77 output signal is a ONE, latching the logic inverter 78 output signal to be ZERO. The DTV signal receiver is conditioned to operate in the QAM reception mode responsive either to the decoder 77 output signal and logic inverter 78 input signal being a ONE, or to the logic inverter 78 output signal being ZERO.

The DTV signal receiver will continue to operate in the QAM reception mode until a PN511 sequence is again detected in the real and the imaginary sample streams from the digital synchrodyne circuitry 5, which re-initializes the counter 76. The decoder 77 output signal then becomes a ZERO, and the logic inverter 78 generates an output signal that is ONE. The DTV signal receiver is conditioned to operate in the VSB reception mode responsive either to the decoder 77 output signal and logic inverter 78 input signal being a ZERO, or to the logic inverter 78 output signal being ONE.

Figure 6:
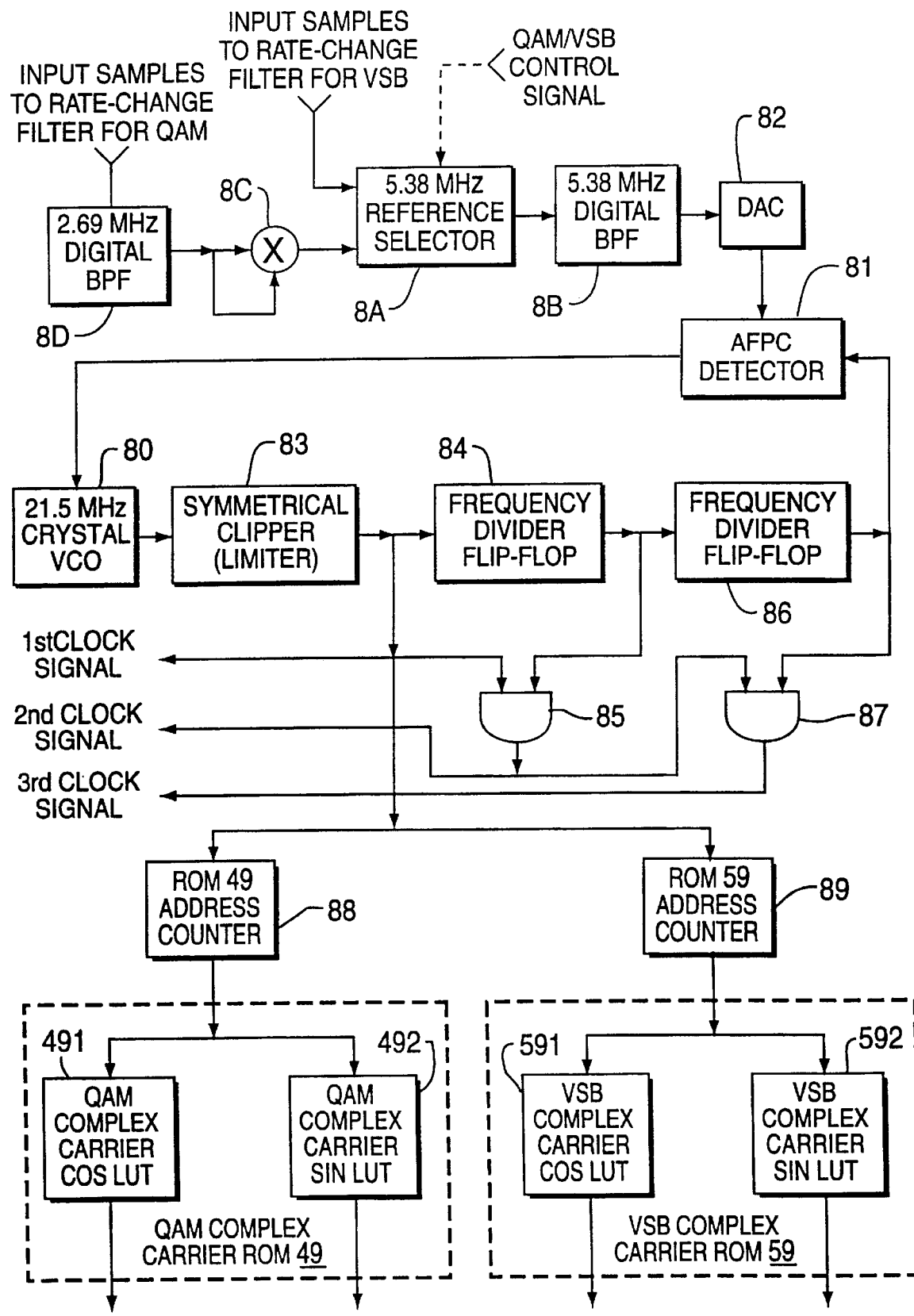
FIG. 6 is a detailed block schematic diagram of circuitry for providing the sample clock generator, the look-up table read-only memories (ROMs) for supplying digital descriptions of the complex carriers used for synchrodyning digital QAM signals and digital VSB signals at final IF signal frequencies each to baseband, and the address generators for those ROMs.

FIG. 6 shows in detail a representative construction of the sample clock generator 8 shown in FIG. 1. This construction includes a voltage-controlled oscillator 80 that generates cissoidal oscillations nominally of 21.52 MHz frequency.

The oscillator 80 is a controlled oscillator, the frequency and phase of its oscillations being controlled by an automatic frequency and phase control (AFPC) signal voltage. This AFPC signal voltage is generated by an automatic frequency and phase control (AFPC) detector 81, which compares frequency-divided response to the oscillations of the oscillator 80 with a 5.38 MHz reference carrier supplied from a digital-to-analog converter (DAC) 82. Preferably, oscillator 80 is of a type using a crystal for stabilizing the natural frequency and phase of its oscillations. A symmetrical clipper or limiter 83 generates an essentially squarewave response to these cissoidal oscillations, which is used as the first clock signal for timing the sampling of the final IF signal in the ADC 19. A first frequency-divider flip-flop 84 responds to transitions of the first clock signal in a prescribed sense for generating another square wave with a fundamental frequency of 10.76 MHz, half the frequency of the oscillations of the oscillator 80. The frequency-divider flip-flop 84 supplies squarewave output signal with a fundamental frequency of 10.76 MHz to an AND circuit 85 to be ANDed with the first clock signal for generating a second clock signal used by the rate conversion filter 93 (shown in FIG. 2) for implementing 2:1 decimation. A second frequency-divider flip-flop 86 responds to transitions of the second clock signal in a prescribed sense for generating another square wave with a fundamental frequency of 5.38 MHz. This frequency-divided response to the oscillations of the oscillator 80 is supplied to the AFPC detector 81 for comparison with the 5.38 MHz reference carrier supplied from the DAC 82. This square wave with a fundamental frequency of 5.38 MHz e is also applied to an AND circuit 87 to be ANDed with the AND circuit 85 response for generating a third clock signal used by the rate conversion filter 91 (shown in FIG. 2) for implementing 4:1 decimation.

The frequency-divider flip-flop 84 supplies the count input to a sample counter 88, which generates addresses for the QAM complex carrier ROM 49 shown in FIGS. 3 and 6. The counter 88 counts to the value required to read a complete cycle of sine values and cosine values of the QAM complex carrier and then rolls over to its initial count value to continue counting samples.

The frequency-divider flip-flop 84 supplies the count input to a sample counter 89, which generates addresses for the VSB complex carrier ROM 59 shown in FIGS. 4 and 6. The counter 89 counts to the value required to read a complete cycle of sine values and cosine values of the VSB complex carrier and then rolls over to its initial count value to continue counting samples. In certain circumstances the counters 88 and 89 can share components or can even be the same counter.

The 5.38 MHz reference carrier supplied from the digital-to-analog converter 82 is generated by using a narrow bandpass filter for extracting a component of the received DTV signal as synchrodyned to baseband, which component is of a frequency that is a subharmonic of the symbol frequency (or baud frequency), and multiplying that subharmonic of the symbol frequency by an appropriate factor in frequency multiplier circuitry. More particularly, a digital multiplexer 8A responds to the PN sequence presence detector 7 (shown in FIG. 1) detecting PN511 sequences accompanying the received DTV signal, which is indicative that the received DTV signal is a VSB signal, to select the undecimated real samples of the equalizer 90 response for application to a bandpass FIR digital filter 8B that provides a selective response centered at 5.38 MHz to select the first subharmonic of symbol frequency from the VSB signal. The digital multiplexer 8A responds to the PN sequence presence detector 7 (shown in FIG. 1) not detecting PN511 sequences as accompany the received DTV signal, which is indicative that the received DTV signal is a QAM signal, to select the output signal of a squaring circuit 8C for application to the bandpass filter 8B that provides a selective response centered at 5.38 MHz. A bandpass FIR digital filter 8D that provides a selective response centered at 2.69 MHz for selecting the 2.69 MHz first subharmonic of the symbol frequency of a baseband QAM signal supplies input signal to the squaring circuit 8C, which generates harmonics of the filter 8D response including a strong 5.38 MHz component. This baseband QAM signal can be supplied either from the real samples of the equalizer 90 response or, alternatively, from the imaginary samples of the equalizer 90 response.

The squaring circuit 8C is shown in FIG. 6 as a digital multiplier receiving the filter 8D response both as multiplier and multiplicand. The squaring circuit 8C can be constructed from logic gates as a digital multiplier, but for the sake of speedier operation is better provided by a ROM storing a look-up table of squares. An absolute-value circuit can be used as a substitute for the squaring circuit in generating harmonics of the response of a preceding filter, but produces weaker second harmonics and so is not preferred.

Figure 7:
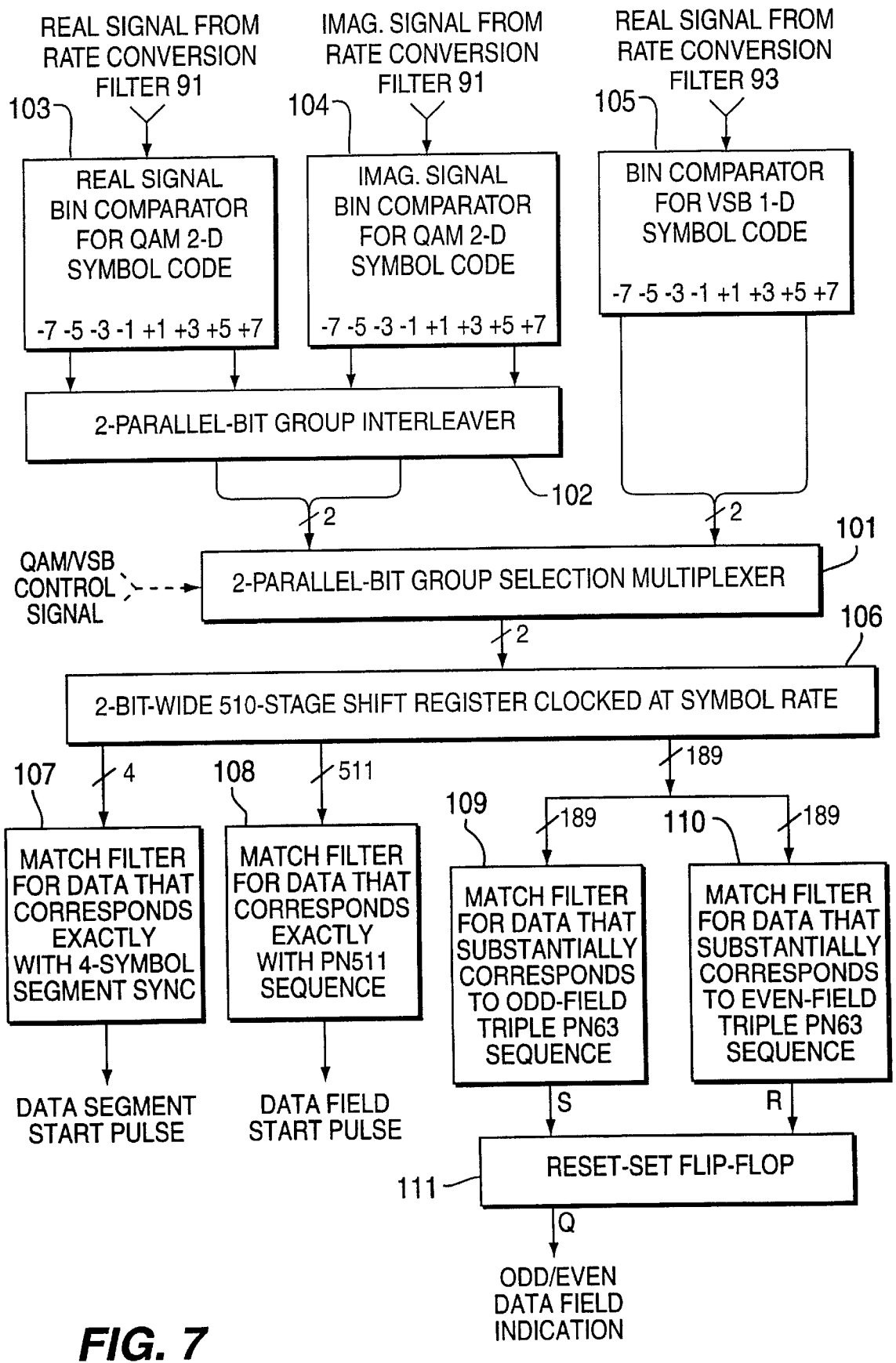
FIG. 7 is a block schematic diagram of data synchronization recovery circuitry embodying aspects of the invention.

FIG. 7 shows in greater detail the construction of the data synchronization information recovery circuitry 100. A digital multiplexer 101 receives groups of two-parallel-bit information at each of its two input ports and reproduces at its output port the information supplied to one of those input ports, as selected in response to a QAM/VSB control signal supplied by the PN sequence presence detector 7.

When the QAM/VSB control signal is in a first state that conditions the DTV signal receiver to operate in the QAM DTV signal reception mode, the digital multiplexer 101 reproduces at its output port the two-parallel-bit information supplied to its first input port from an interleaver 102. The interleaver 102 alternately selects two-parallel-bit samples supplied from the −5 and +5 outputs of a bin amplitude comparator 103 and two-parallel-bit samples supplied from the −5 and +5 outputs of a bin amplitude comparator 104. The bin amplitude comparators 103 and 104 provide partial symbol decoding at 5.38*10$^6$ sample per second rate for the real component and for the imaginary component, respectively, of QAM baseband signal supplied as input signal thereto from the rate conversion filter 91 of FIG. 1. The interleaver 102 supplies its selected two-parallel-bit samples to the first input port of the multiplexer 101 at 10.76*10$^6$ sample per second rate.

When the QAM/VSB control signal is in a second state that conditions the DTV signal receiver to operate in the VSB DTV signal reception mode, the digital multiplexer 101 reproduces at its output port the two-parallel-bit information supplied to its second input port from −5 and +5 outputs of a bin amplitude comparator 105. The bin amplitude comparator 105 provides symbol decoding at 10.76*10$^6$ sample per second rate for the real component of VSB baseband signal supplied as input signal thereto from the rate conversion filter 93 of FIG. 1.

A two-bit-wide 510-stage shift register 106 clocked at 10.76*10$^6$ single-stage shifts per second rate receives, as serial input, the two-parallel-bit information reproduced at the output port of the digital multiplexer 101. The shift register 106 provides a 4-parallel-bit output signal to match filter circuitry 107 that generates a data segment start pulse responsive to the occurrence of −5 and +5 bin output data corresponding to the result of bin amplitude comparing the 4-symbol data segment synchronization code used in ATSC VSB DTV signal. The shift register 106 provides a 511-parallel-bit output signal to match filter circuitry 108 that generates a data field start pulse responsive to the occurrence of −5 and +5 bin output data corresponding to the result of bin amplitude comparing the PN511 sequence in the field synchronization code used in ATSC VSB DTV signal.

The shift register 106 provides a 189-parallel-bit output signal to match filter circuitry 109 that generates a pulse indicative of the data field being odd responsive to the occurrence of −5 and +5 bin output data corresponding to the result of bin amplitude comparing the triple PN63 sequence in the field synchronization code used in odd data fields of the ATSC VSB DTV signal. The shift register 106 provides a 189-parallel-bit output signal to match filter circuitry 110 that generates a pulse indicative of the data field being even responsive to the occurrence of −5 and +5 bin output data corresponding to the result of bin amplitude comparing the triple PN63 sequence in the field synchronization code used in even data fields of the ATSC VSB DTV signal. The pulses from the match filter circuitry 109 are applied to the set (S) input connection of the flip-flop 111 as set pulses, and the pulses from the match filter circuitry 109 are applied to the reset (R) input connection of a reset-set flip-flop 111 as reset pulses. The true (Q) output of the flip-flop 111 is a ONE during the portion of each odd data field after the match filter circuitry 109 generates a set pulse and is a ZERO during the portion of each even data field after the match filter circuitry 110 generates a reset pulse.

Figure 8:
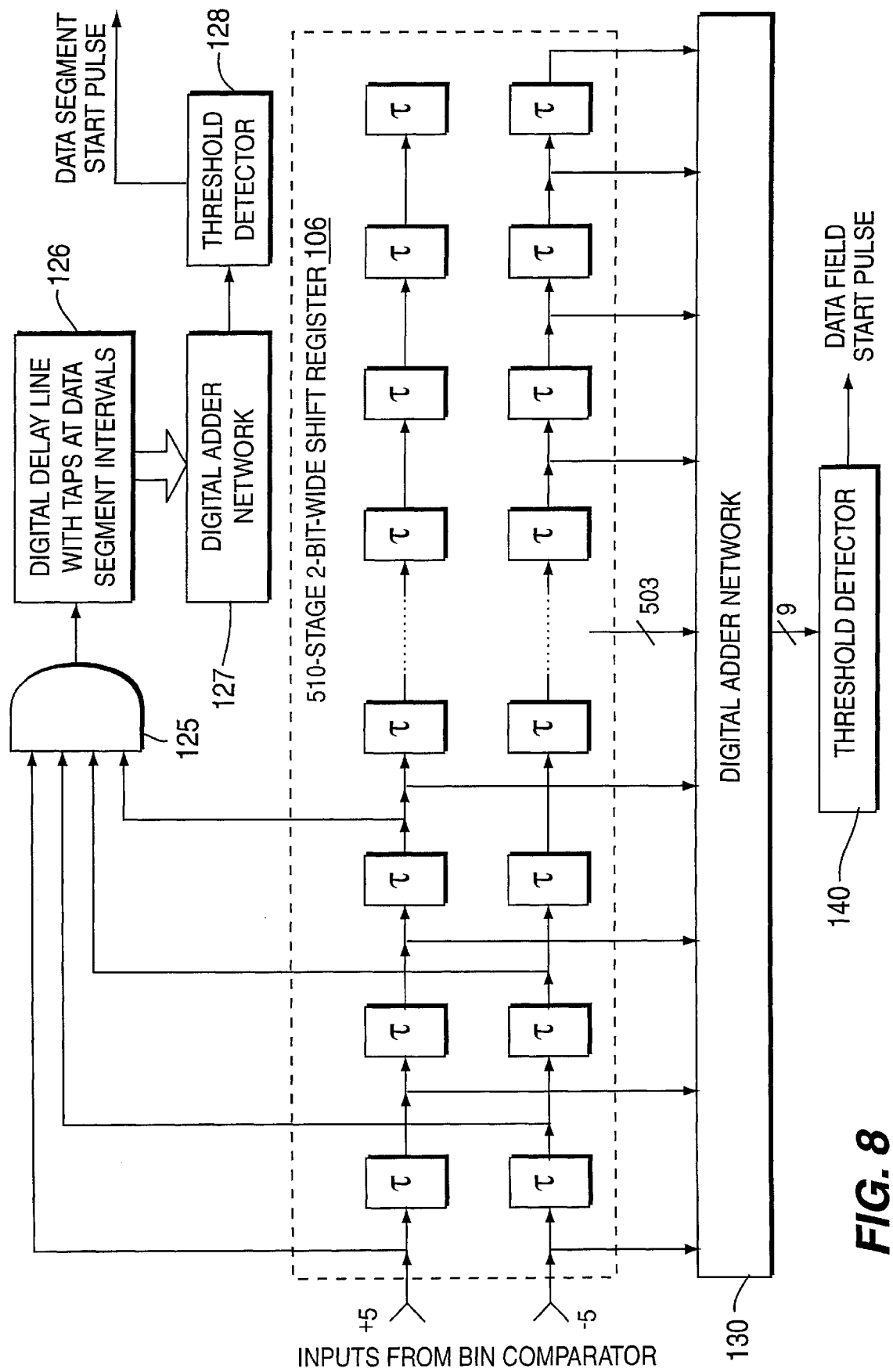
FIG. 8 is a detailed block schematic diagram of a portion of the FIG. 7 data synchronization recovery circuitry.

FIG. 8 shows in detail how the segment-sync match filter circuitry 107 can be realized in accordance with an aspect of the invention. A 4-input AND gate 125 receives from the shift register 106 the current +5-bin output signal of a bin amplitude comparator, the −5-bin output signals of the bin amplitude comparator one and two symbol epochs back, and the +5-bin output signal of the bin amplitude comparator three symbol epochs back as input signals. All four inputs to the AND gate 125 will be concurrently ONE when bin comparison results generated in response to a data segment synchronizing signal will be fully entered into the shift register 106 on the next symbol clock. The AND gate 125 responds responds to all four inputs being concurrently ONE to provide a ONE output response and otherwise customarily has a ZERO output response.

The ONE output response of the AND gate 125 could be used by the DTV signal receiver as a DATA SEGMENT START PULSE, but there are occasionally times that data within a line segment can cause ONE output response from the AND gate 125. The data randomization performed at the source of the DTV signal transmission forestalls the 4-symbol data segment synchronization code reappearing at 77.3 microsecond data-segment-duration interval or all but very large multiples thereof. This permits a DATA SEGMENT START PULSE to be generated that is not responsive to the AND gate 125 being ONE at times other than when occurrence of the 4-symbol data segment synchronization code is being detected. Such a DATA SEGMENT START PULSE is generated conveniently using a technique similar to that described in U.S. Pat. No. 5,594,506 issued Jan. 14, 1997. The response of the AND gate 125 is applied as input signal to a digital delay line 126 providing delay over the duration of several data segments and having taps at 832-sample (one-data-segment) intervals. A digital adder network 127 adds together the single-bit responses at the taps of the digital delay line 126. The addition in adder network 127 can be done by assuming the logic ZEROs to be arithmetic zeroes and the logic ONEs to be arithmetic ones in an unsigned addition procedure, for example. Or, by way of alternative example, the addition in adder network 127 can be a signed addition procedure in which the logic ZEROs are converted to arithmetic negative ones (−1's) and the logic ONEs are converted to arithmetic positive ones (+1's). The sum output signal from the digital adder network 127 is supplied to a threshold detector 128 that generates an output signal that is a logic ONE only when a significant portion of the taps of the digital delay line 126 supply ONEs, and that otherwise is a logic ZERO. The logic ONE output signal from the threshold detector 128 is supplied as DATA SEGMENT START PULSE to the rest of the DTV signal receiver.

FIG. 8 further shows in detail how the field-sync match filter circuitry 108 can be realized in accordance with an aspect of the invention. The reader is referred to Section 4.2.7.2 of Annex D of the ATSC Digital Television Standard published Sep. 16, 1995, which prescribes the particular PN511 sequence to be included in the data field synchronization signal and is incorporated by reference into this specification.

Considering the stages of the shift register 106 in reverse order from last to first to correspond respectively with the first to penultimate symbols in the PN511 sequence in the field synchronization code used in ATSC VSB DTV signal, if a symbol in the PN511 sequence is specified to be a ONE that symbol is supposed to have a value +S that is one level below the maximum positive data excursion. The +5-bin amplitude comparison result from the output signal of the corresponding stage of the shift register 106 is selected for verifying whether that symbol has a value +S, he selected +5-bin amplitude comparison result being a ONE if that symbol does indeed have a value +S and being a ZERO if that symbol does not have a value +S. Since the first seven symbols in the PN511 sequence prescribed by the ATSC DTV Standard are each supposed to have a value −S that is one level above the maximum negative data excursion, the final seven stages of the shift register 106 need not provide storage locations for +5-bin amplitude comparison results.

Still considering the stages of the shift register 106 in reverse order from last to first to correspond respectively with the first to penultimate symbols in the PN511 sequence in the field synchronization code used in ATSC VSB DTV signal, if a symbol in the PN511 sequence is specified to be a ZERO that symbol is supposed to have a value −S that is one level above the maximum negative data excursion. The −5-bin amplitude comparison result from the output signal of the corresponding stage of the shift register 106 is selected for verifying whether that symbol has a value −S, the selected −5-bin amplitude comparison result being a ONE if that symbol does indeed have a value −S and being a ZERO if that symbol does not have a value −S. Since the last symbol in the PN511 sequence is supposed to have a value −S that is one level above the maximum negative data excursion, the current −5-bin amplitude comparison result is included in the 511 selected bin amplitude comparison results.

When the first 510 2-parallel-bit groups of bin amplitude comparison results corresponding to successive symbols of the PN 511 sequence are in respective stages of the shift register 106 and the 2-parallel-bit group of bin amplitude comparison results corresponding to the last symbol of the PN 511 sequence is held in the output latch of the multiplexer 101, the 511 selected bin amplitude comparison results will all be ONEs under ideal reception conditions, so these 511 selected bin amplitude comparison results could be ANDed by a 511-input AND gate for generating the DATA FIELD START PULSE. In practice, noise or multipath distortion may cause some of the selected bin amplitude comparison results erroneously to be ZERO instead. So, instead of ANDing the selected bin amplitude comparison results, they are added together in a digital adder network 130 which treats logic ZEROs and ONEs as arithmetic zeroes and ones, respectively, and the resultant sum is supplied to a threshold detector 140. The threshold detector 140 generates an output signal that is a logic ONE only when most of the selected bin amplitude comparison results are ONEs, and that otherwise is a logic ZERO. The logic ONE output signal from the threshold detector 140 is supplied as DATA FIELD START PULSE to the rest of the DTV signal receiver.

During reception of VSB DTV signals, the detection of the PN511 sequence from selected bin amplitude comparison results, rather than using a match filter on the symbols themselves, can provide stronger discrimination against DTV information data in the later data segments of each data field being confused with the PN511 sequence in the initial data segment of each data field. Unless the bin amplitude comparator 105 detects a symbol that has a value +S that is one level below the maximum positive data excursion or that has a value −S that is one level above the maximum negative data excursion, there is no contribution to response by the match filter circuitry 108 in embodiments of the invention in which the digital adder network 130 treats logic ZEROs and ONEs as arithmetic zeroes and ones, respectively.

The construction of the match filter circuitry 109 and of the match filter circuitry 110 is along lines similar to that of the match filter circuitry 108 except for the different filter kernels involved. A selected one of each of the bin amplitude comparison results applied as input signals to 189 consecutive stages of the shift register 106 is supplied as a respective input to a digital adder network, and the resultant sum of these bits is supplied to a threshold detector. The reader is referred to Section 4.2.7.3 of Annex D of the ATSC Digital Television Standard published Sep. 16, 1995, which prescribes the particular PN63 sequences to be included in the data field synchronization signal and is incorporated by reference into this specification.

The match filter circuitry 107 and the match filter circuitry 108 will not share the same shift register 106 with each other in some embodiments of the invention nor with the match filter circuitry 109 and the match filter circuitry 110 in other embodiments of the invention. There can be shim delay inserted between the various shift registers to vary the timing of the pulse responses of the match filter circuitry 107 and the match filter circuitry 108 respective to each other and respective to the pulse responses of the match filter circuitry 109 and the match filter circuitry 110. For example, the toggling of the R-S flip-flop 111 can be made to occur coincidentally with, or very shortly after, the DATA FIELD START PULSE.

Figure 9:
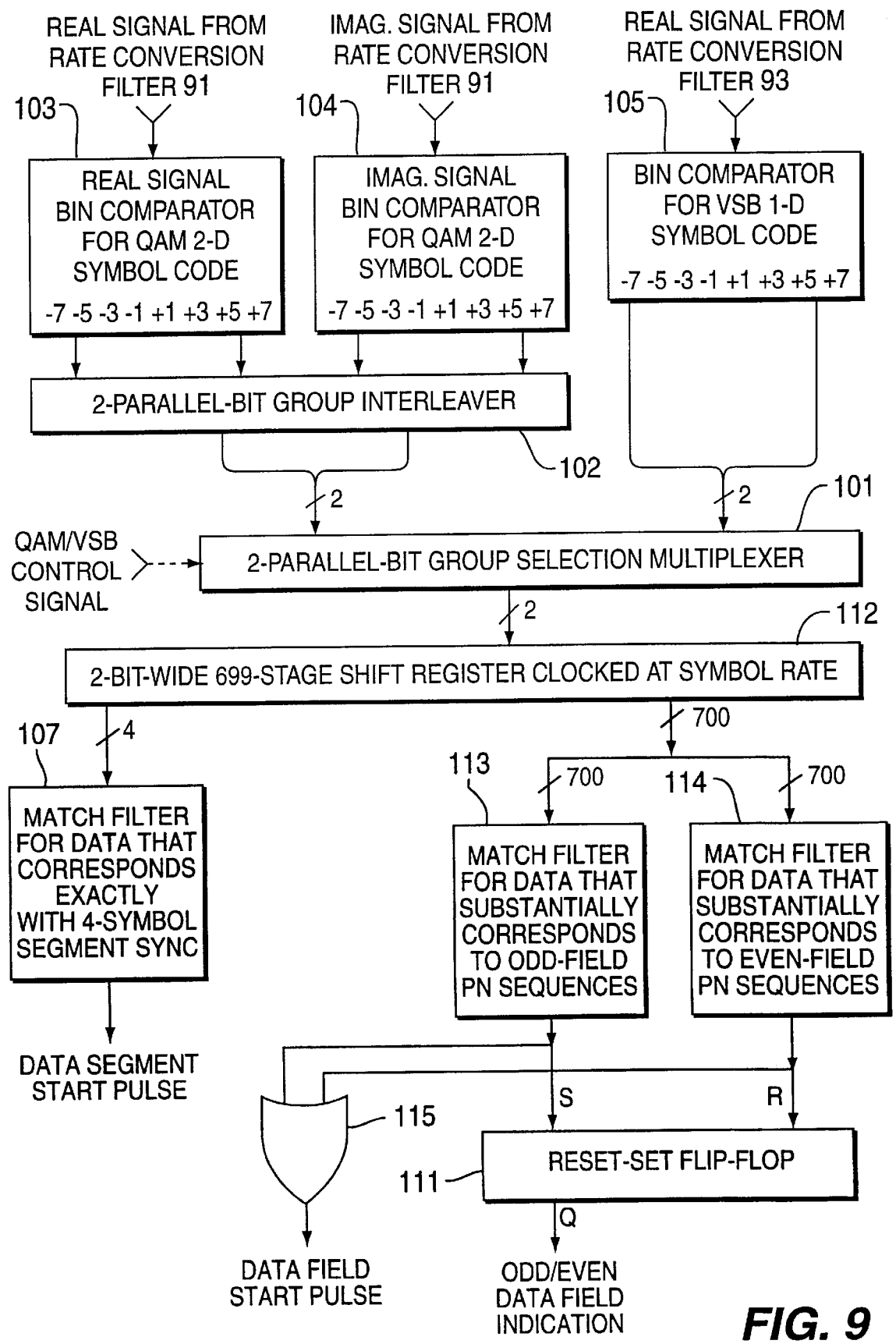
FIG. 9 is a block schematic diagram of data synchronization recovery circuitry which embodies aspects of the invention and is alternative to the data synchronization recovery circuitry shown in FIG. 7.

FIG. 9 shows in greater detail a construction of the data synchronization information recovery circuitry 100 alternative to that shown in FIG. 7. In the FIG. 9 construction toggling of the R-S flip-flop 111 occurs coincidentally with the DATA FIELD START PULSE. This is implemented by performing match filtering for the entire set of PN sequences in each odd data field and by performing match filtering for the entire set of PN sequences in each even data field.

Elements 101–105 are similar in design and operation in both FIGS. 7 and 9. In FIG. 9 the two-parallel-bit information reproduced at the output port of the digital multiplexer 101 is supplied as serial input, not to a 510-stage shift register 106, but rather to a two-bit-wide 699-stage shift register 112 clocked at 10.76*10⁶ single-stage shifts per second rate. In FIG. 9 the shift register 112 (instead of shift register 106 per FIG. 7) provides a 4-parallel-bit output signal to the match filter circuitry 107 that generates a data segment start pulse. The shift register 112 provides a 700-parallel-bit output signal to match filter circuitry 113 that generates a pulse indicative of the data field being odd responsive to the occurrence of −5 and +5 bin output data corresponding to the result of bin amplitude comparing PN511 sequence followed by the triple PN63 sequence in the field synchronization code used in odd data fields of the ATSC VSB DTV signal. The shift register 112 provides a 700-parallel-bit output signal to match filter circuitry 114 that generates a pulse indicative of the data field being even responsive to the occurrence of −5 and +5 bin output data corresponding to the result of bin amplitude comparing PN511 sequence followed by the triple PN63 sequence in the field synchronization code used in even data fields of the ATSC VSB DTV signal. The pulses from the match filter circuitry 113 are applied to the set (S) input connection of the flip-flop 111 as set pulses, and the pulses from the match filter circuitry 114 are applied to the reset (R) input connection of a reset-set flip-flop 111 as reset pulses. As in the FIG. 7 data sync recovery circuitry, the true (Q) output of the flip-flop 111 is a ONE during the portion of each odd data field after the match filter circuitry 109 generates a set pulse and is a ZERO during the portion of each even data field after the match filter circuitry 110 generates a reset pulse.

In the FIG. 9 data sync recovery circuitry the pulses from the match filter circuitry 113 and the pulses from the match filter circuitry 114 are ORed in a two-input OR gate 115 to generate the DATA FIELD START PULSE coincidentally with the toggling of the R-S flip-flop 111, rather than using match filter circuitry 108 to generate the DATA FIELD START PULSE as done in the FIG. 7 data sync recovery circuitry. Note that, in a modification of the FIG. 7 data sync recovery circuitry, an auxiliary DATA FIELD START PULSE coincidental with the toggling of the R-S flip-flop 111 can be generated as the response of an OR gate supplied pulses from match filter circuitry 109 at one input and supplied pulses from match filter circuitry 110 at another input.

Figure 10:
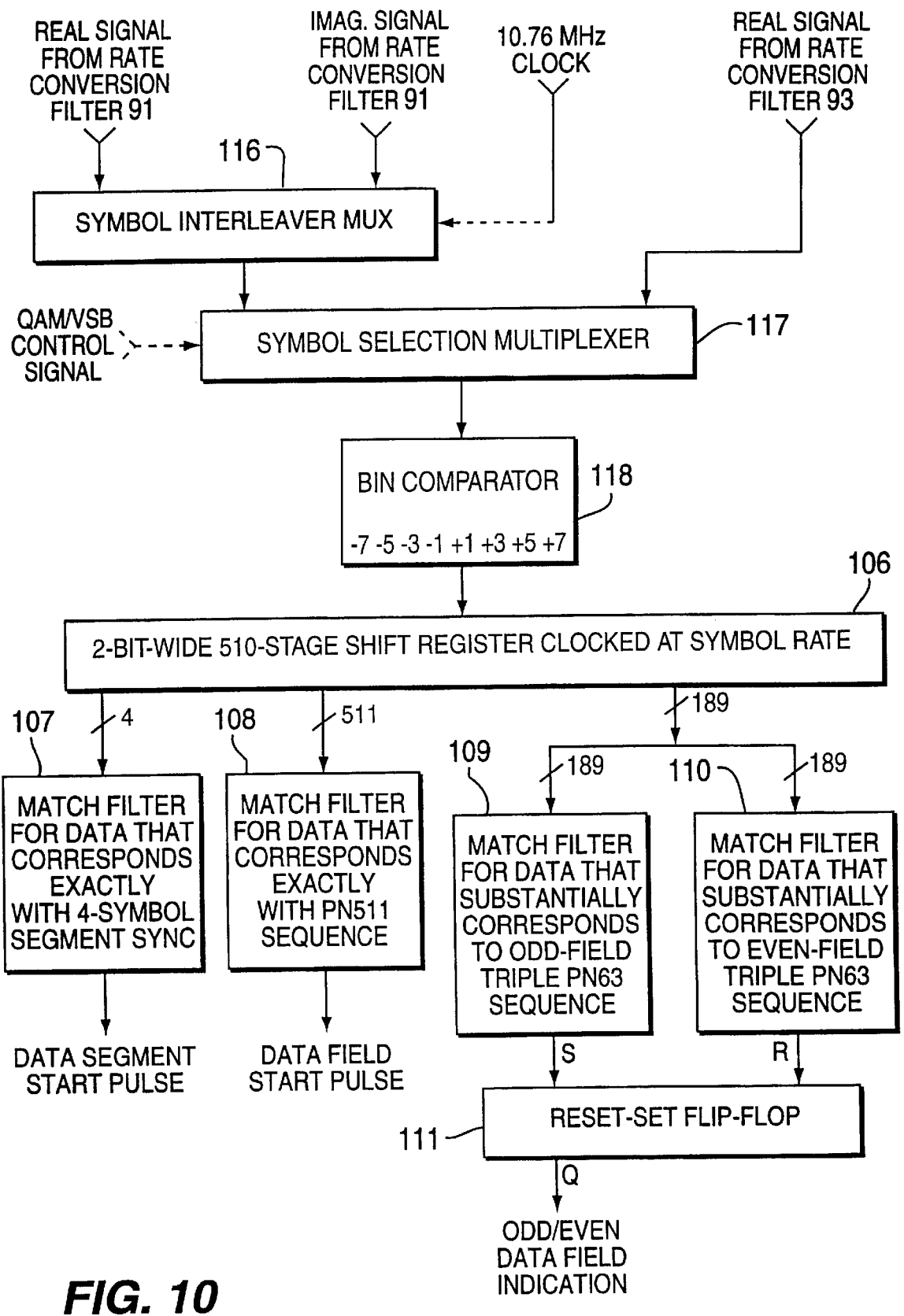
FIG. 10 is a block schematic diagram of modified FIG. 7 data synchronization recovery circuitry embodying aspects of the invention.

FIG. 10 shows a modification of the FIG. 7 data sync recovery circuitry in which a symbol interleaver multiplexer 116 responds to a 10.76 MHz square wave clock signal for alternating samples of real signal from the rate conversion filter 91 and imaginary signal from the rate conversion filter 91 to generate an interleaved signal having 10.76*10⁶ samples per second. A symbol selection multiplexer 117 responds to QAM/VSB control signal indicating that the DTV receiver is conditioned for operating in the QAM DTV signal reception mode to reproduce this interleaved signal in its output signal. The symbol selection multiplexer 117 responds to QAM/VSB control signal indicating that the DTV receiver is conditioned for operating in the VSB DTV signal reception mode to reproduce in its output signal a real signal supplied to the multiplexer 117 from the rate conversion filter 93. The bin amplitude comparator 118 senses the multiplexer 117 output signal currently being in one of eight possible slice regions and −5 and +5 bin output data are supplied as 2-parallel-bit information that is serially applied to the shift register 106 as shift input signal.

Figure 11:
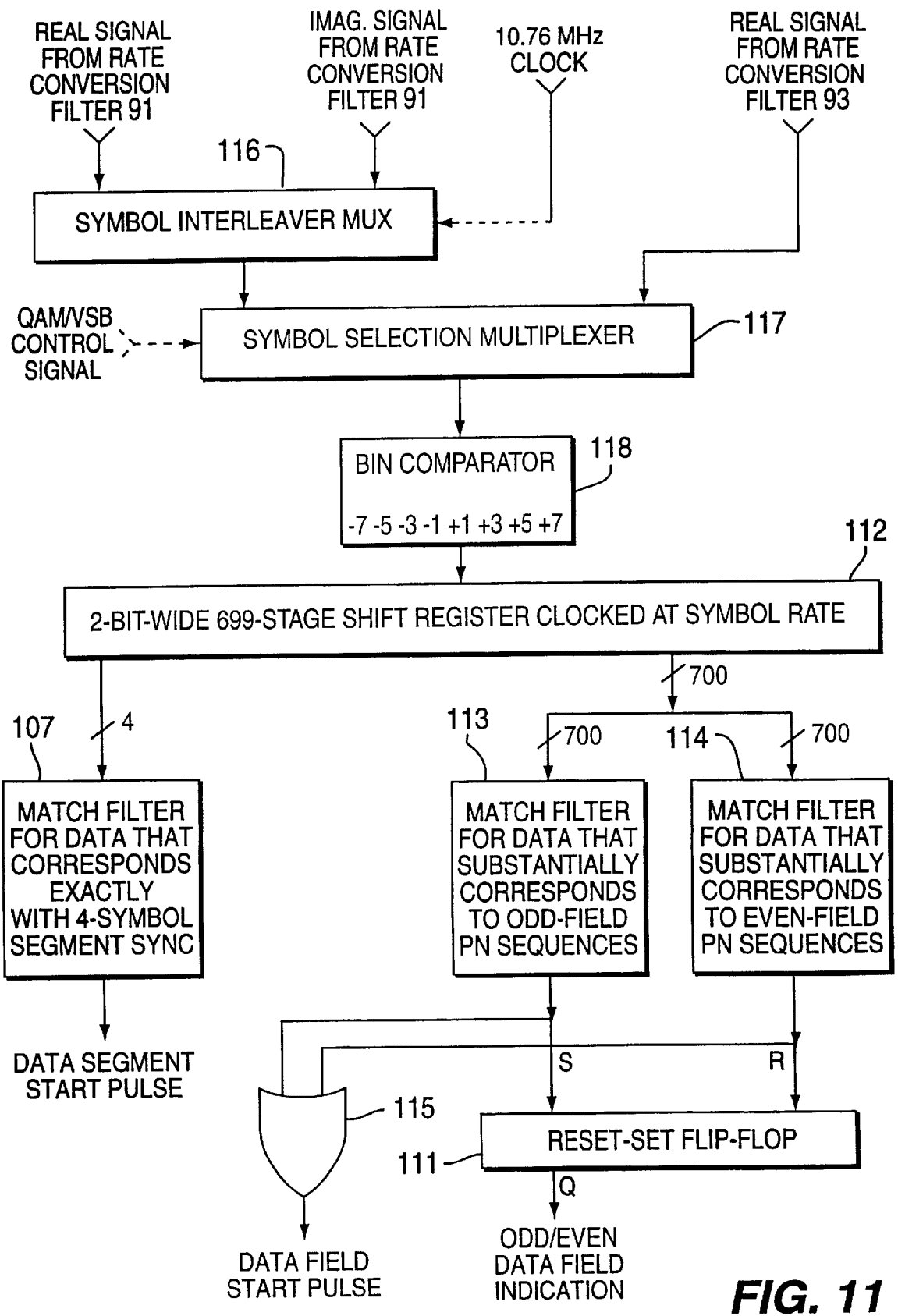
FIG. 11 is a block schematic diagram of modified FIG. 9 data synchronization recovery circuitry embodying aspects of the invention.

FIG. 11 shows a modification of the FIG. 9 data sync recovery circuitry in which a symbol interleaver multiplexer 116 responds to a 10.76 MHz square wave clock signal for alternating samples of real signal from the rate conversion filter 91 and imaginary signal from the rate conversion filter 91 to generate an interleaved signal having 10.76*10⁶ samples per second. A symbol selection multiplexer 117 responds to QAM/VSB control signal indicating that the DTV receiver is conditioned for operating in the QAM DTV signal reception mode to reproduce this interleaved signal in its output signal. The symbol selection multiplexer 117 responds to QAM/VSB control signal indicating that the DTV receiver is conditioned for operating in the VSB DTV signal reception mode to reproduce in its output signal a real signal supplied to the multiplexer 117 from the rate conversion filter 93. The bin amplitude comparator 118 senses the multiplexer 117 output signal currently being in one of eight possible slice regions and −5 and +5 bin output data are supplied as 2-parallel-bit information that is serially applied to the shift register 106 as shift input signal.

Figure 12:
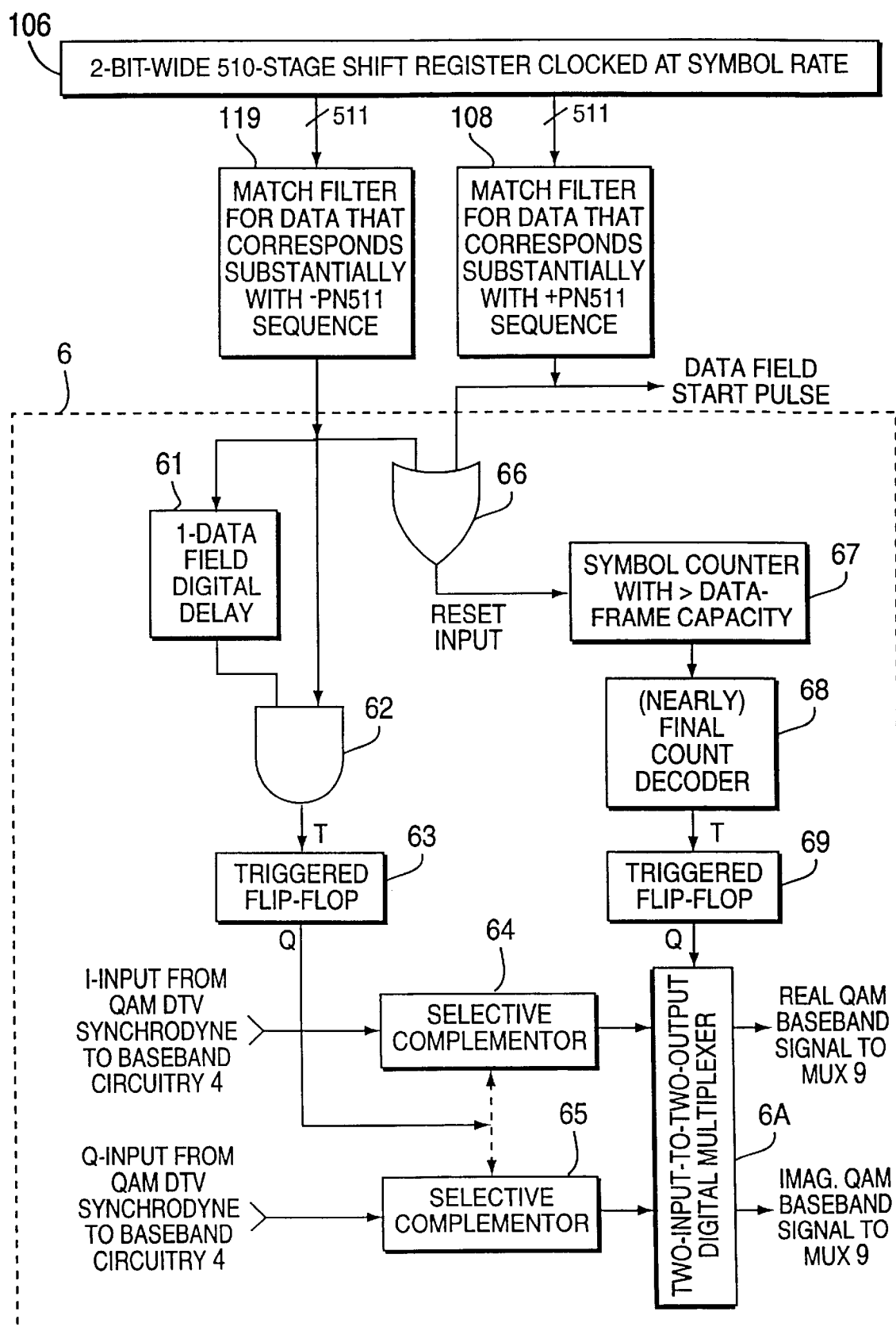
FIG. 12 is a block schematic diagram of data synchronization recovery circuitry embodying the invention being used to implement symbol synchronization during QAM signal reception in accordance with further aspects of the invention.

FIG. 12 shows modification that can be made to the FIG. 7 or FIG. 9 data sync recovery circuitry to implement the symbol synchronization circuitry 6 that FIG. 1 shows being used after the digital synchrodyne circuitry 4 for detecting baseband QAM signals. The two-bit-wide 510-stage shift register 106 supplies samples to a match filter 119 for data that corresponds substantially with the complement of the PN511 sequence used in the field synchronization code as well as to the match filter 108 for data that corresponds substantially with that PN511 sequence itself. The match filter 119 will generate an output pulse in the initial data segment of each data field that the digital synchrodyne circuitry 4 detects with carrier phasing 180° from desired phase, and otherwise should never generate an output pulse owing to the data randomization procedures carried out on DTV information data. The possibility of erroneous output pulse is further forestalled by applying undelayed match filter 119 response and that response as delayed for the duration of one data field interval as input signals to a two-input AND gate 62. AND gate 62 output will pulse to ONE only when the match filter 119 repeatedly detects the complement of the PN511 sequence used in the field synchronization code, each later time of detection being later than the preceding time of detection by exactly the interval of a data field. An edge of this pulse will trigger a triggered flip-flop 63 to change the state of its true (Q) output signal. The true output signal of flip-flop 63 controls whether or not the polarities of the in-phase and quadrature-phase signals received from the digital synchrodyne circuitry 4 are reversed as those signals are reproduced in the output signals from the selective complementors 64 and 65. Each of the selective complementors 64 and 65 comprises a battery of NOR gates, a respective one for each bit of the signal that selective complementor receives from the digital synchrodyne circuitry 4. Since there should be virtually no possibility of erroneous output pulse from the match filter 119, to reduce DTV receiver cost a bit the flip-flop 63 can be triggered directly by such output pulse without using the error rejection filter comprising elements 61 and 62.

A two-input OR gate 66 receives the pulse responses of the match filters 108 and 109 as respective input signals and will respond with a ONE-going pulse the initial data segment of each data field providing the in-phase and quadrature-phase signals received from the digital synchrodyne circuitry 4 are respectively real and imaginary baseband QAM signals. This ONE-going pulse resets a symbol counter 67 with the capability of counting a number of symbols greater than the number of symbols in a data field, preferably a number of symbols greater than the number of symbols in a data frame. A decoder 68 generates a ONE when final count before count rollover is reached (or in alternative design) when a somewhat smaller count is reached. An edge of the ONE-going pulse supplied by the decoder 68 will trigger a triggered flip-flop 69 to change the state of its true (Q) output signal. The true output signal of flip-flop 69 controls whether a two-input-to-two-output digital multiplexer 6A will generate the real and imaginary baseband QAM signals supplied to the synchrodyne result selection multiplexer 9 from the in-phase and quadrature-phase signals supplied by the selective complementors 64 and 65, respectively, or whether the multiplexer 6A will generate the real and imaginary baseband QAM signals supplied to the synchrodyne result selection multiplexer 9 from the quadrature-phase and in-phase signals supplied by the selective complementors 65 and 64, respectively.

If the digital synchrodyne circuitry 4 detects with correct carrier phasing or with carrier phasing 180° from desired phase, the OR gate 66 will reset the symbol counter 67 so the decoder 68 will not generate a ONE-going pulse to trigger a change in the true output state of the flip-flop 69. Normally, the PN511 sequence or its complement will be detected in the initial data segment of each data field to reset the symbol counter 67. If the PN511 sequence or its complement is not detected in the initial data segment of one data field (e. g., owing to the QAM signal being accompanied by impulse noise), likely it will be detected in the initial data segment of the following data field, to reset the symbol counter 67 so the decoder 68 will not generate a ONE-going pulse to trigger a change in the true output state of the flip-flop 69. There will be no change in regard to which of the in-phase and quadrature-phase signals respectively supplied by the selective complementors 64 and 65 the multiplexer 6A will respond to for generating the real and imaginary baseband QAM signals supplied to the synchrodyne result selection multiplexer 9.

If the digital synchrodyne circuitry 4 detects with carrier phasing 90° or 270° from desired phase, the OR gate 66 will not generate a ONE-going pulse to reset the symbol counter 67 during the initial data segments of two consecutive data fields. The symbol counter 67 will reach the count that causes the decoder 68 to generate a ONE-going pulse that triggers a change in the true output state of the flip-flop 69. The multiplexer 6A will switch which of the in-phase and quadrature-phase signals respectively supplied by the selective complementors 64 and 65 the multiplexer 6A responds to for generating the real and imaginary baseband QAM signals supplied to the synchrodyne result selection multiplexer 9.

Since the trellis decoders 92 and 94 of FIG. 1 generally use optimal Viterbi decoding with "soft" data slicing rather than "hard" data slicing using bin amplitude comparators with amplitude bins having fixed boundaries, the bin comparators 103–105 of FIGS. 7 and 9 and the bin comparator 118 of FIGS. 10 and 11 can each be constructed in simplified form, with the bins for −3, −1, +1 and +3 levels being replaced by a single all-inclusive bin. This construction results in a bin comparator with reduced requirements for transistors, but operationally equivalent to the eight-bin amplitude comparator for the purposes of the invention.

What is claimed is:

1. A digital television receiver comprising:
    demodulation circuitry for supplying baseband symbol code responsive to a received digital television signal carrier modulation;
    a bin amplitude comparator for performing bin amplitude comparisons on said baseband symbol code at symbol rate for determining which amplitude slice a current symbol reposes in and for supplying concurrent bin occupancy results for an amplitude slice including a value +S and for an amplitude slice including a value −S, which values +S and −S define the positive and negative excursions respectively of a binary data synchronization signal;
    a shift register with a plurality of successive stages each capable of temporarily storing a respective two-parallel-bit group, said shift register arranged to receive as serial input signal thereto successive two-parallel-bit groups formed from said concurrent bin occupancy results supplied from said bin amplitude comparator; and
    match filtering circuitry responsive to a number of bits each selected from a respective one of said successive parallel-bit groups as currently supplied from said bin amplitude comparator and as temporarily stored in stages of said shift register and supplying a pulse when said number of bits are at least substantially the same as those resulting from decoding a particular symbol code sequence used for data synchronization.

2. A digital television receiver as set forth in claim 1, further comprising:
    a demodulator for demodulating a vestigial-sideband amplitude-modulation digital television signal to supply said baseband signal.

3. A digital television receiver as set forth in claim 2, wherein said match filtering is of a type for supplying a data segment start pulse only if said number of bits are the same as those resulting from decoding a particular symbol code sequence used as a data segment synchronization signal.

4. A digital television receiver as set forth in claim 3, wherein said match filtering comprises:
    an AND gate connected for receiving the output signals of said bin amplitude comparator and a number of successive stages of said shift register at respective input connections and for supplying a pulse whenever a data segment synchronization code is temporarily stored in said number of successive stages of said shift register; and
    means for deriving data segment start pulses from at least selected ones of the pulses supplied from an output connection of said AND gate.

5. A digital television receiver as set forth in claim 4, wherein said means for deriving data segment start pulses from at least selected ones of the pulses supplied from the output connection of said AND gate comprises:
    a digital delay line having an input connection from the output connection of said AND gate and being provided with a plurality of taps at data segment intervals;
    a digital adder network for summing the signals at the taps of said digital delay line to generate a sum signal; and
    a threshold detector for supplying a respective data segment start pulse whenever said sum signal exceeds a prescribed value.

6. A digital television receiver as set forth in claim 2, wherein said particular symbol code sequence is indicative of a data field synchronization signal.

7. A digital television receiver as set forth in claim 6, wherein said match filtering is of a type for supplying a data field start pulse when said number of bits are at least substantially the same as those resulting from decoding a PN511 sequence.

8. A digital television receiver as set forth in claim 7, wherein said match filtering comprises:
    a first digital adder network connected for receiving said number of bits at respective input connections and for supplying a sum response to said number of bits; and a first threshold detector with an input connection for receiving said sum response of said first digital adder network and an output connection for supplying a pulse whenever said sum response of said first digital adder network exceeds a prescribed threshold value.

9. A digital television receiver as set forth in claim 8, further comprising:

further match filtering circuitry of a type for supplying a pulse when the other bits in said successive parallel-bit groups as currently supplied from said bin amplitude comparator and as temporarily stored in stages of said shift register, from each of which said groups one said bit thereof is selected for said match filtering circuitry, are at least substantially the same as those resulting from decoding another symbol code sequence comprising the complement of said PN511 sequence.

10. A digital television receiver as set forth in claim 9, wherein said further match filtering circuitry comprises:

a second digital adder network connected for receiving said other bits at respective input connections and for supplying a sum response to said other bits;

a second threshold detector with an input connection for receiving said sum response of said second digital adder network and an output connection for supplying a pulse whenever said sum response of said second digital adder network exceeds a prescribed threshold value.

11. A digital television receiver as set forth in claim 10 including:

an OR gate, having respective input connections from the output connections of said first threshold detector and from said second threshold detector, and having an output connection.

12. A digital television receiver as set forth in claim 6, wherein said particular symbol code sequence comprises three similar PN63 sequences, said particular symbol code sequence being indicative of a data field synchronization signal in the initial data segment of the earlier data field in each data frame of a series of data frames, each said data frame consisting of two data fields.

13. A digital television receiver as set forth in claim 12, further comprising:

further match filtering circuitry responsive to said successive parallel-bit groups for detecting another number of bits, which bits are the same as those resulting from decoding another symbol code sequence comprising three PN63 sequences, said other symbol code sequence being indicative of a data field synchronization signal in the initial data segment of the later data field in each data frame of said series of data frames.

14. A digital television receiver as set forth in claim 13, further comprising:

an OR gate having a first input connection for receiving pulses from said match filter circuitry, having a second input connection for receiving pulses from said further match filter circuitry, and having an output connection for supplying a data field start pulse whenever a pulse is received at one of its first and second input connections.

15. A digital television receiver as set forth in claim 13, further comprising:

a flip-flop having a set input connection for receiving pulses from said match filter circuitry, having a reset input connection for receiving pulses from said further match filter circuitry, and having an output connection for supplying indication of whether a current data field is the earlier or later data field in a current data frame.

16. A digital television receiver as set forth in claim 6, wherein said particular symbol code sequence comprises a PN511 sequence and three similar PN63 sequences, said particular symbol code sequence being indicative of a data field synchronization signal in the initial data segment of the earlier data field in each data frame of a series of data frames, each said data frame consisting of two data fields.

17. A digital television receiver as set forth in claim 16, further comprising:

further match filtering circuitry responsive to said successive parallel-bit groups for detecting another number of bits, which bits are the same as those resulting from decoding another symbol code sequence comprising a PN511 sequence and three PN63 sequences, said other symbol code sequence being indicative of a data field synchronization signal in the initial data segment of the later data field in each data frame of said series of data frames.

18. A digital television receiver as set forth in claim 17, further comprising:

an OR gate having a first input connection for receiving pulses from said match filter circuitry, having a second input connection for receiving pulses from said further match filter circuitry, and having an output connection for supplying a data field start pulse whenever a pulse is received at one of its first and second input connections.

19. A digital television receiver as set forth in claim 17, further comprising:

a flip-flop having a set input connection for receiving pulses from said match filter circuitry, having a reset input connection for receiving pulses from said further match filter circuitry, and having an output connection for supplying indication of whether a current data field is the earlier or later data field in a current data frame.

20. A digital television receiver as set forth in claim 1, further comprising:

a demodulator for demodulating a quadrature-amplitude-modulation digital television signal to supply said baseband signal.

21. A digital television receiver as set forth in claim 20, wherein said match filtering is of a type for supplying a data segment start pulse only if said number of bits are the same as those resulting from decoding a particular symbol code sequence used as a data segment synchronization signal.

22. A digital television receiver as set forth in claim 21, wherein said match filtering comprises:

an AND gate connected for receiving the output signals of said bin amplitude comparator and a number of successive stages of said shift register at respective input connections and for supplying a pulse whenever a data segment synchronization code is temporarily stored in said number of successive stages of said shift register; and means for deriving data segment start pulses from at least selected ones of the pulses supplied from an output connection of said AND gate.

23. A digital television receiver as set forth in claim 22, wherein said means for deriving data segment start pulses from at least selected ones of the pulses supplied from the output connection of said AND gate comprises:

a digital delay line having an input connection from the output connection of said AND gate and being provided with a plurality of taps at data segment intervals;

a digital adder network for summing the signals at the taps of said digital delay line to generate a sum signal; and a threshold detector for supplying a respective data segment start pulse whenever said sum signal exceeds a prescribed value.

24. A digital television receiver as set forth in claim 20, wherein said particular symbol code sequence is indicative of a data field synchronization signal.

25. A digital television receiver as set forth in claim 24, wherein said match filtering is of a type for supplying a data field start pulse when said number of bits are at least substantially the same as those resulting from decoding a PN511 sequence.

26. A digital television receiver as set forth in claim 25, wherein said match filtering comprises:

a first digital adder network connected for receiving said number of bits at respective input connections and for supplying a sum response to said number of bits; and a first threshold detector with an input connection for receiving said sum response of said first digital adder network and an output connection for supplying a pulse whenever said sum response of said first digital adder network exceeds a prescribed threshold value.

27. A digital television receiver as set forth in claim 26, further comprising:

further match filtering circuitry of a type for supplying a pulse when the other bits in said successive parallel-bit groups as currently supplied from said bin amplitude comparator and as temporarily stored in stages of said shift register, from each of which said groups one said bit thereof is selected for said match filtering circuitry, are at least substantially the same as those resulting from decoding another symbol code sequence comprising the complement of said PN511 sequence.

28. A digital television receiver as set forth in claim 27, wherein said further match filtering circuitry comprises:

a second digital adder network connected for receiving said other bits at respective input connections and for supplying a sum response to said other bits;

a second threshold detector with an input connection for receiving said sum response of said second digital adder network and an output connection for supplying a pulse whenever said sum response of said second digital adder network exceeds a prescribed threshold value.

29. A digital television receiver as set forth in claim 28 including:

an OR gate, having respective input connections from the output connections of said first threshold detector and from said second threshold detector, and having an output connection.

30. A digital television receiver as set forth in claim 24, wherein said particular symbol code sequence comprises three similar PN63 sequences, said particular symbol code sequence being indicative of a data field synchronization signal in the initial data segment of the earlier data field in each data frame of a series of data frames, each said data frame consisting of two data fields.

31. A digital television receiver as set forth in claim 30, further comprising:

further match filtering circuitry responsive to said successive parallel-bit groups for detecting another number of bits, which bits are the same as those resulting from decoding another symbol code sequence comprising three PN63 sequences, said other symbol code sequence being indicative of a data field synchronization signal in the initial data segment of the later data field in each data frame of said series of data frames.

32. A digital television receiver as set forth in claim 31, further comprising:

an OR gate having a first input connection for receiving pulses from said match filter circuitry, having a second input connection for receiving pulses from said further match filter circuitry, and having an output connection for supplying a data field start pulse whenever a pulse is received at one of its first and second input connections.

33. A digital television receiver as set forth in claim 31, further comprising:

a flip-flop having a set input connection for receiving pulses from said match filter circuitry, having a reset input connection for receiving pulses from said further match filter circuitry, and having an output connection for supplying indication of whether a current data field is the earlier or later data field in a current data frame.

34. A digital television receiver as set forth in claim 24, wherein said particular symbol code sequence comprises a PN511 sequence and three similar PN63 sequences, said particular symbol code sequence being indicative of a data field synchronization signal in the initial data segment of the earlier data field in each data frame of a series of data frames, each said data frame consisting of two data fields.

35. A digital television receiver as set forth in claim 34, further comprising:

further match filtering circuitry responsive to said successive parallel-bit groups for detecting another number of bits, which bits are the same as those resulting from decoding another symbol code sequence comprising a PN511 sequence and three PN63 sequences, said other symbol code sequence being indicative of a data field synchronization signal in the initial data segment of the later data field in each data frame of said series of data frames.

36. A digital television receiver as set forth in claim 35, further comprising:

an OR gate having a first input connection for receiving pulses from said match filter circuitry, having a second input connection for receiving pulses from said further match filter circuitry, and having an output connection for supplying a data field start pulse whenever a pulse is received at one of its first and second input connections.

37. A digital television receiver as set forth in claim 35, further comprising:

a flip-flop having a set input connection for receiving pulses from said match filter circuitry, having a reset input connection for receiving pulses from said further match filter circuitry, and having an output connection for supplying indication of whether a current data field is the earlier or later data field in a current data frame.

* * * * *